(12) United States Patent
Sasaki

(10) Patent No.: US 7,995,438 B2
(45) Date of Patent: Aug. 9, 2011

(54) REPRODUCING METHOD, OPTICAL DISK APPARATUS, PROGRAM AND COMPUTER READABLE INFORMATION RECORDING MEDIUM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 587 days.

(21) Appl. No.: 11/665,372

(22) PCT Filed: Oct. 14, 2005

(86) PCT No.: PCT/JP2005/019353
§ 371 (c)(1),
(2), (4) Date: Apr. 13, 2007

(87) PCT Pub. No.: WO2006/043649
PCT Pub. Date: Apr. 27, 2006

(65) Prior Publication Data
US 2007/0288949 A1    Dec. 13, 2007

(30) Foreign Application Priority Data

Oct. 18, 2004  (JP) .................................. 2004-302562

(51) Int. Cl.
*G11B 7/00* (2006.01)
(52) U.S. Cl. .................................. 369/53.24; 369/47.38
(58) Field of Classification Search .................. None
See application file for complete search history.

(56) References Cited

U.S. PATENT DOCUMENTS

| | | | | |
|---|---|---|---|---|
| 5,781,516 A * | 7/1998 | Yamada | ...................... | 369/30.13 |
| 6,711,106 B2 | 3/2004 | Sasaki | | |
| 6,918,003 B2 | 7/2005 | Sasaki | | |
| 2002/0114245 A1 | 8/2002 | Sasaki | | |
| 2002/0159353 A1 | 10/2002 | Sasaki | | |
| 2002/0196715 A1* | 12/2002 | Hung et al. | ................ | 369/30.16 |
| 2003/0033475 A1 | 2/2003 | Sasaki | | |
| 2003/0133369 A1 | 7/2003 | Sasaki | | |
| 2003/0223338 A1 | 12/2003 | Sasaki | | |
| 2004/0057366 A1 | 3/2004 | Sasaki | | |
| 2004/0076084 A1* | 4/2004 | Yonezawa | .................... | 369/30.1 |
| 2004/0090886 A1 | 5/2004 | Sasaki | | |

(Continued)

FOREIGN PATENT DOCUMENTS

CN       1343353 A    4/2002

(Continued)

OTHER PUBLICATIONS

W. J. Koros et al., "Membrane-based Gas Separation", *Journal of Membrane Science*, 1993, vol. 83, pp. 1-80.

*Primary Examiner* — Hoa T Nguyen
*Assistant Examiner* — Emily Frank
(74) *Attorney, Agent, or Firm* — Dickstein Shapiro LLP

(57) ABSTRACT

Upon scanning with an optical spot from a first address on the first recording layer as a start point for a second address on the second recording layer which is a target address for reproducing in order to detect a reproduction position, a scanning path for reaching the second address by scanning an already recorded zone of at least one of the first recording layer and the second recording layer is selected from a first scanning path to carry out seeking after a focus jump and a second scanning path to carry out seeking before the focus jump, based on a positional relationship between a known boundary position between a not-yet-recorded zone and an already-recorded zone of the first recording layer or the second recording layer and the first address.

12 Claims, 18 Drawing Sheets

U.S. PATENT DOCUMENTS

| | | |
|---|---|---|
| 2004/0165499 A1 | 8/2004 | Sasaki |
| 2005/0030852 A1 | 2/2005 | Sasaki |
| 2005/0254360 A1* | 11/2005 | Sameshima et al. ........ 369/44.23 |
| 2005/0276176 A1* | 12/2005 | Cheu et al. ................. 369/44.28 |

FOREIGN PATENT DOCUMENTS

| | | |
|---|---|---|
| CN | 1475997 | 2/2004 |
| JP | 7-503984 | 4/1995 |
| JP | 7-299883 | 11/1995 |
| JP | 09-282675 | 10/1997 |
| JP | 2002-008252 | 1/2002 |
| JP | 2004-63025 | 2/2004 |
| JP | 2004-288308 | 10/2004 |
| JP | 2005-267704 | 9/2005 |
| WO | WO 01/37269 A1 | 5/2001 |

\* cited by examiner

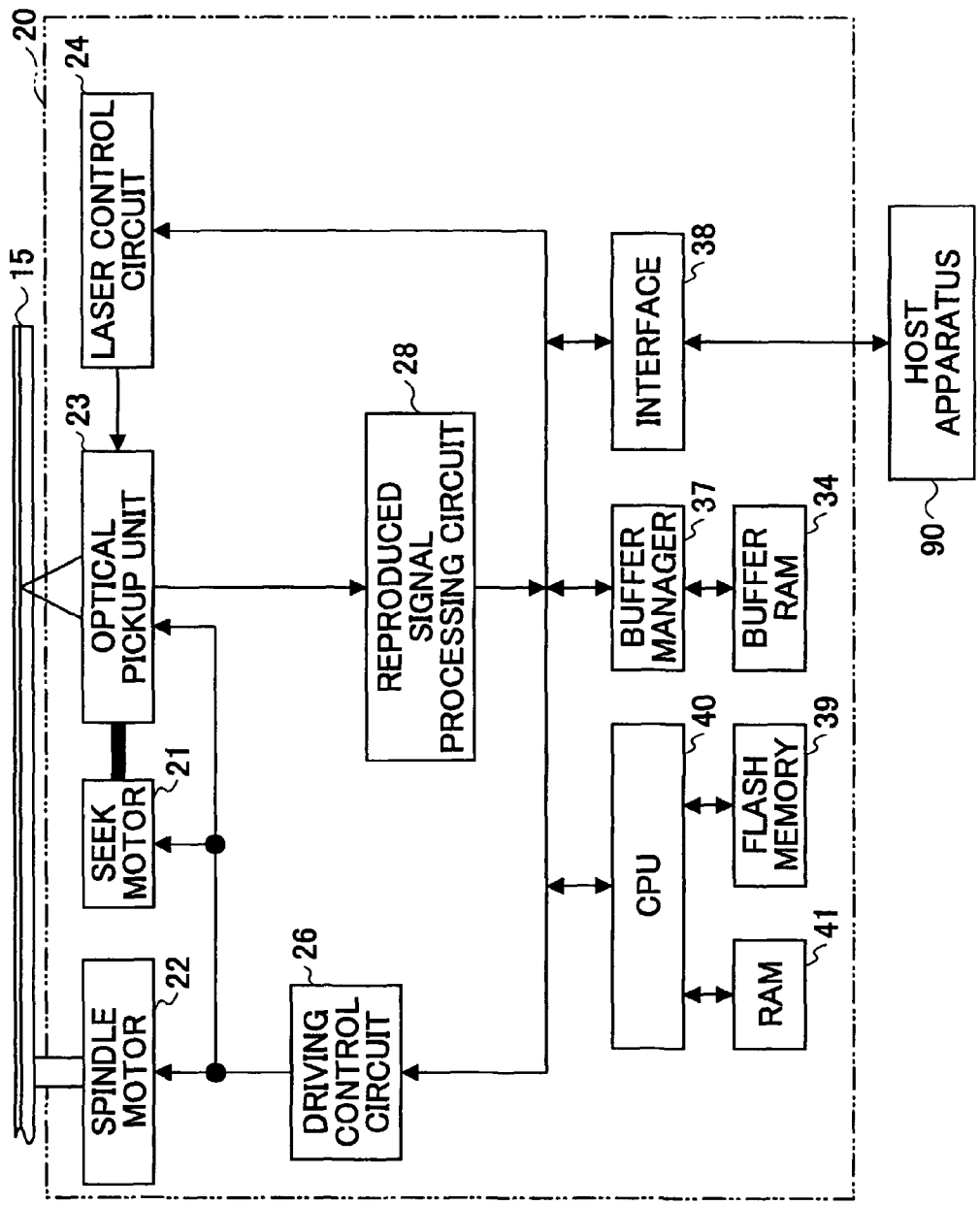

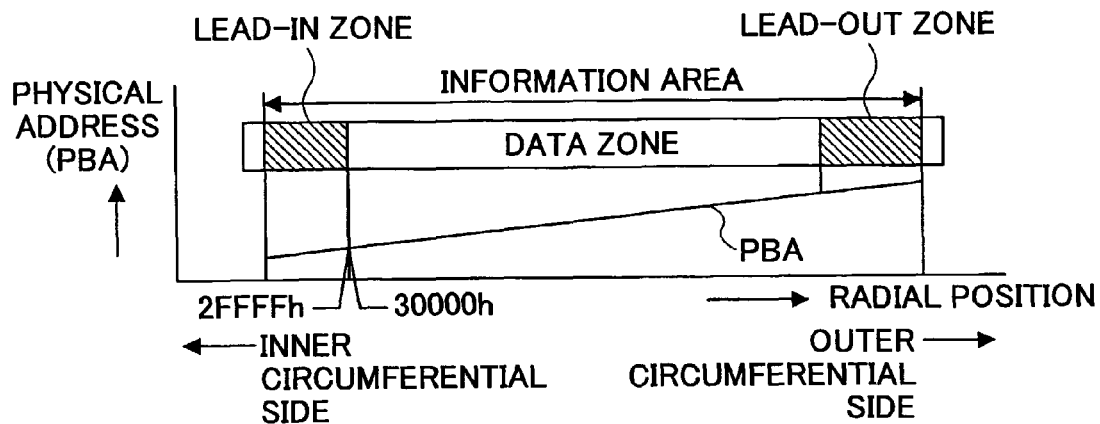
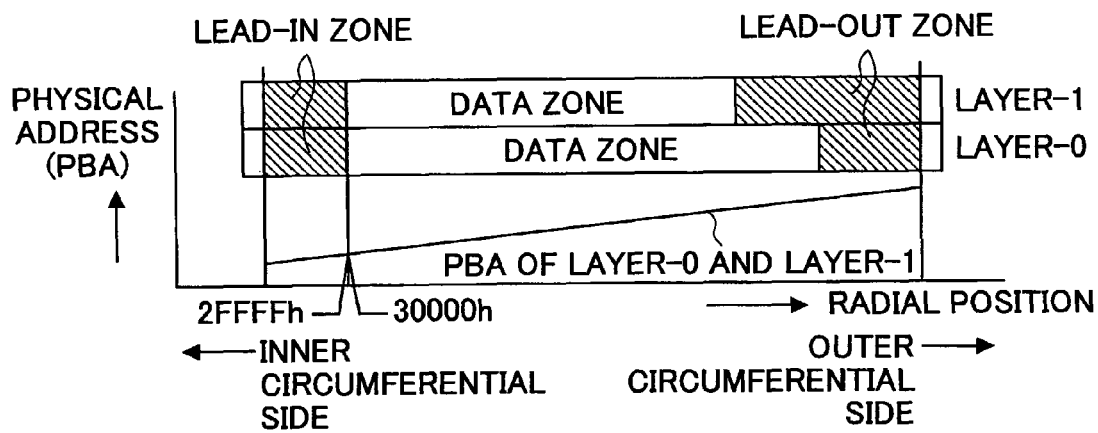
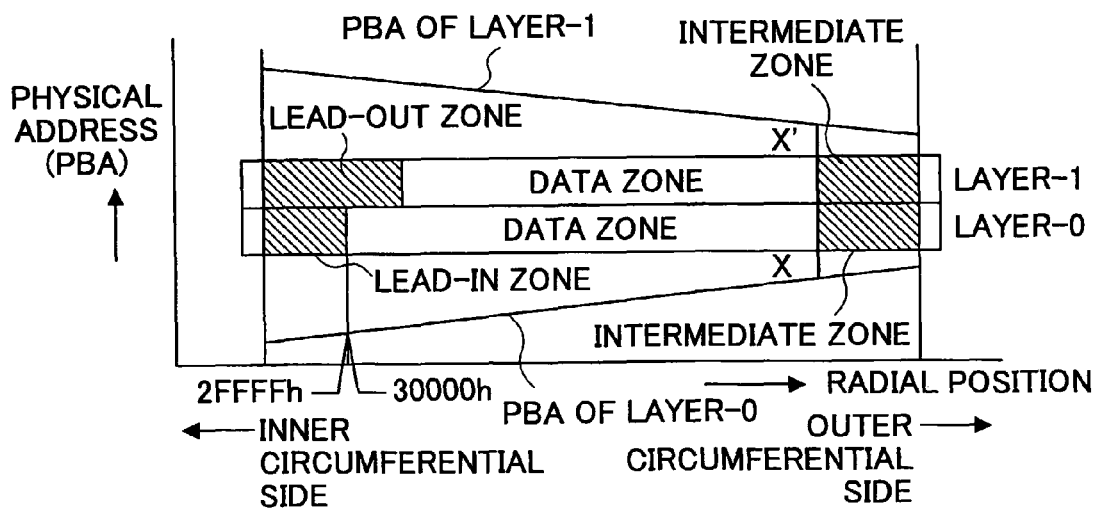

FIG.5A

| CONTENTS | NUMBER OF BYTES |
|---|---|
| IDENTIFICATION ID | 4 |
| RESTRICTION INFORMATION FOR UNKNOWN IDENTIFICATION ID | 4 |
| DRIVE ID | 32 |
| SESSION NUMBER | 4 |
| SESSION ITEM 0 | 16 |
| ... | — |
| SESSION ITEM N | 16 |
| RESERVED | — |

FIG.5B

| CONTENTS | NUMBER OF BYTES |
|---|---|
| FRAGMENT ITEM ID | 3 |
| FRAGMENT NUMBER | 2 |
| FRAGMENT START ADDRESS | 3 |
| FRAGMENT END ADDRESS | 3 |
| RESERVED | 5 |

FIG.5C

| CONTENTS | NUMBER OF BYTES |
|---|---|
| PREVIOUS SESSION ITEM ID | 3 |
| PREVIOUS SESSION NUMBER | 2 |
| PREVIOUS SESSION START ADDRESS | 3 |
| PREVIOUS SESSION END ADDRESS | 3 |
| RESERVED | 5 |

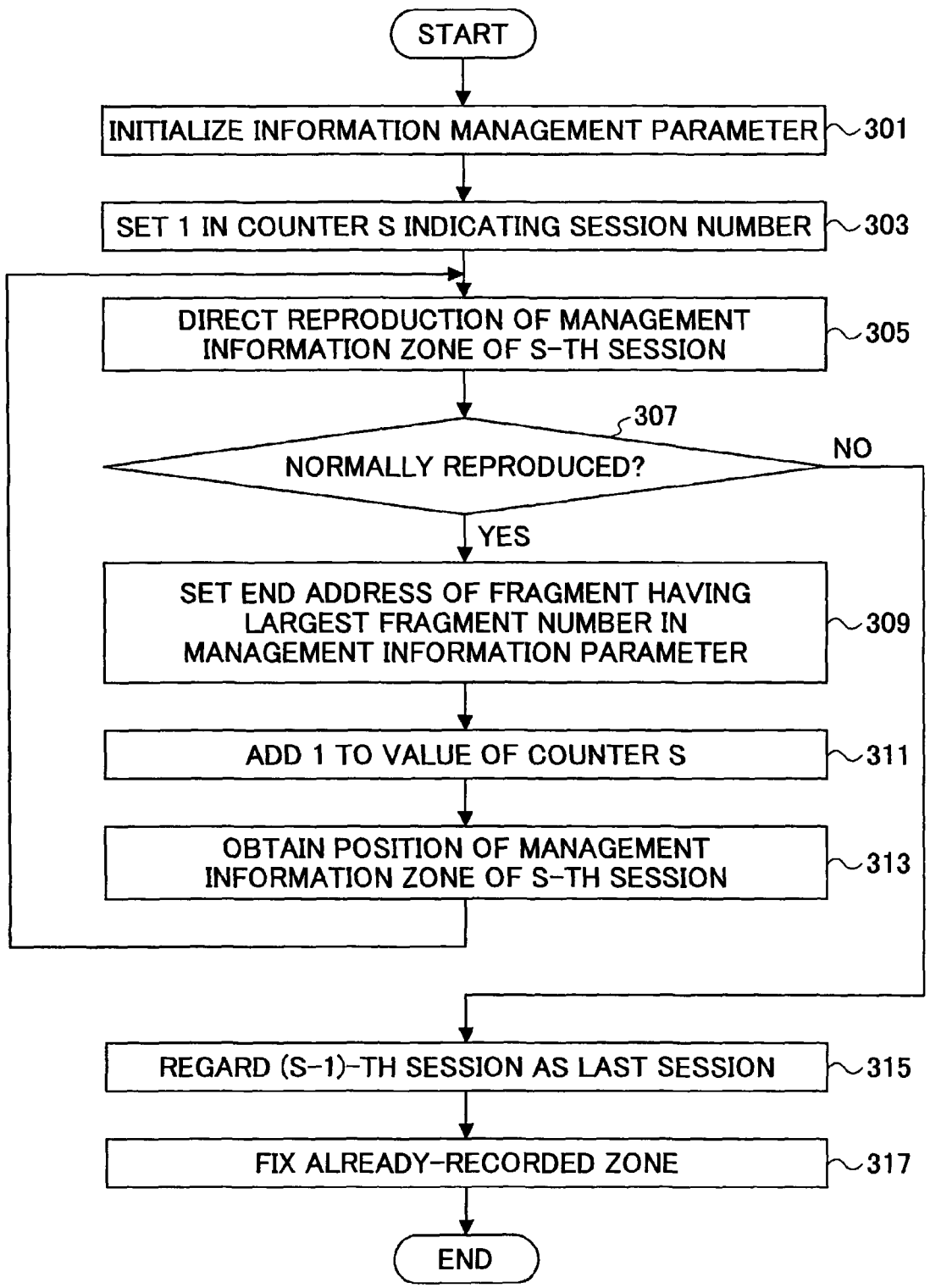

REPRODUCING METHOD, OPTICAL DISK APPARATUS, PROGRAM AND COMPUTER READABLE INFORMATION RECORDING MEDIUM

TECHNICAL FIELD

The present invention relates to a reproducing method, an optical disk apparatus, a program and a computer readable information recording medium, and further, to a reproducing method for reproducing information recorded in an optical disk having a plurality of recording layers, an optical disk apparatus for reproducing information recorded in an optical disk having a plurality of recording layers, a program applied in the optical disk apparatus and a computer readable information recording medium storing the program.

BACKGROUND ART

Recently, along with an advance of digital technology and improvement in data compressing technology, an optical disk such as a DVD (digital versatile disk) has been taking attention, and, an optical disk apparatus for reproducing information from such an optical disk has spread in the market along with a price reduction thereof.

An information amount of contents to process tends to increase year by year, and thereby, increase in a recording capacity in such an optical disk has been demanded. In order to increase the recording capacity of the optical disk, an optical disk having a plurality of recording layers and an apparatus for accessing such a type of optical disks have been developed eagerly.

As an optical disk having two recording layers provided only for reproducing information therefrom, a DVD-ROM (may be referred to as a 'single-side double-layer DVD-ROM' hereinafter) having two recording layers on one side has been put into a practical use. In this single-side double-layer DVD-ROM, information reproduction from each recording layer is achieved as a result of a laser beam being applied from one side and it being focused on a target layer. Accordingly, reproduction of information from each recording layer of the optical disk is allowed without turning over it. Further, as another type of an optical disk having two recording layers on which information can be recorded on one side, a DVD+R (may be referred to as a 'single-side double-layer DVD+R) exits. In this single-side double-layer DVD+R, also, reproduction of information from each recording layer without turning over the optical disk is allowed. Such a type of an optical disk having two recording layers on one side (referred to as a layer-0 and a layer-1) is generally referred to as a single-side double-layer disk, hereinafter.

In an information reproducing apparatus handling such a single-side double-layer disk, one of the following two scanning paths (referred to as a scanning path A and a scanning path B, respectively) is employed, as a scanning path for scanning with an optical spot from an address (current address) on one recording layer (referred to as X) to an address (target address) on another recording layer (referred to as Y). In the scanning path A, focus jump is carried out in a current position X from the recording layer X to the recording layer Y. Then, on the recording layer Y, seeking is carried out for the target address. In the scanning path B, an address on the recording layer X at the same radial position as that of the target address with respect to the optical disk radial direction is set as a temporary target address. Then, after seeking is carried out from the current address to the temporary target address, focus jump is carried out from the recording layer X to the recording layer Y (see Japanese Laid-open Patent Application No. 9-282675, for example). Generally speaking, since high speed scanning operation is easily achieved in the scanning path A than in the scanning path B, the scanning path A is employed in many information reproducing apparatuses handling single-side double-layer disks. It is noted that, Japanese Laid-open Patent Application No. 2002-8252 for example discloses a configuration in which focus jump and seeking are carried out in parallel.

In a single-side double-layer disk (for example, a single-side double-layer DVD+R before finalization), as shown in FIG. 16A, the entirety of a data zone of the layer 0 is an already-recorded zone, while, in the layer-1, a not-yet-recorded zone remains at a part (disk inner circumferential side) of the data zone, focus jump is carried out to the layer-1 in a position of an address 'a' as shown in FIG. 16B, in the above-mentioned scanning path A, for scanning with an optical spot from the address 'a' (current address) on the inner circumferential side of the layer-0 to an address 'b' (target address) of the already-recorded zone in the layer-1. However, in this case, since the layer-1 has the not-yet-recorded zone at the same position as that of the address 'a' with respect to a radial direction of the optical disk, address information otherwise included in reproduced data cannot be obtained, and thus, focus jump may not be carried out properly.

Further, as shown in FIG. 16C, when scanning with an optical spot from an address "a" (current address) to an address "b" (target address), first a temporary target address "a'" is set, and then seeking is carried out on the layer-1 to the temporary target address "a'", in the scanning path B. However, since, in this case, the temporary target address is included in the not-yet-recorded zone, address information otherwise included in reproduced data cannot be obtained, and thus, seek error may occur.

Thus, in an information reproducing apparatus handling a single-side double-layer disk, information recorded at a target address may not be reproduced even when the target address is included in an already-recorded zone, for a case where a not-yet-recorded zone and the already-recorded zone are mixed in an optical disk.

DISCLOSURE OF THE INVENTION

The present invention has been devised under the circumstance, and a first object of the present invention is to provide a reproducing method and an optical disk apparatus by which information recorded in an optical disk having a plurality of recording layers and having a not-yet-recorded zone and an already-recorded zone mixed therein can be properly and stably reproduced.

A second object of the present invention is to provide a program executed by a computer for controlling an optical disk apparatus, whereby information recorded in an optical disk having a plurality of recording layers and having a not-yet-recorded zone and an already-recorded zone mixed therein can be properly and stably reproduced, and a computer readable information recording medium storing the program.

According to a first aspect of the present invention, a reproducing method for reproducing information from an optical disk having a plurality of recording layers including a first recording layer and a second recording layer, includes the step of:

upon scanning with an optical spot from a first address on the first recording layer as a start point for a second address on the second recording layer which is a target address for reproducing in order to detect a reproduction position, selecting a scanning path for reaching the second address by scanning an already-recorded zone of at least one of the first recording layer and the second recording layer, from a first scanning path to seek after focus jump and a second scanning path to seek before focus jump, based on a positional relationship between a known boundary position between a not-yet-recorded zone and an already-recorded zone of the first recording layer or the second recording layer and the first address.

In this configuration, since scanning with the optical spot for the second address is carried out along the already-recoded zone, address information required for the scanning can be properly obtained during the scanning. As a result, the optical spot can be properly produced at the second address. Accordingly, information recorded in an optical disk having a plurality of recording layers and having a not-yet-recorded zone and an already-recorded zone mixed therein can be properly and stably reproduced.

In this case, in a second aspect of the present invention, when the already-recorded zone includes a plurality of partial zones recording user data separately, the boundary position may be an end address of the user data of the partial zone recording the user data at the last from among the plurality of partial zones.

In the first or the second aspect of the present invention, in a third aspect of the present invention, the first scanning path may be a scanning path to seek for the second address in the second recording layer after a focus jump from the first recording layer to the second recording layer at the start point; and the second scanning path may be a scanning path to seek for the second address in the second recording layer after a focus jump from the first recording layer to the second recording layer at a third address after seeking is made from the start point in the first recording layer for the third address belonging to the first recording layer in the vicinity of the second address with respect to a radial direction of the optical disk.

In this case, in a fourth aspect of the present invention, in the second scanning path, a direction from the third address for the second address may be the same as a direction in which an address increases in the second recording layer, with respect to the radial direction of the optical disk.

In any one of the first through fourth aspects of the present invention, in a fifth aspect of the present invention, in the above-mentioned step of selecting, when a determination address belonging to the second recording layer in the vicinity of the first address is an address included in the already-recorded zone with respect to the radial direction of the optical disk, the first scanning path may be selected.

In any one of the first through fourth aspects of the present invention, in a sixth aspect of the present invention, in said step of selecting, when a determination address belonging to the second recording layer in the vicinity of the first address is an address included in the not-yet-recorded zone with respect to the radial direction of the optical disk, the second scanning path may be selected.

According to a seventh aspect of the present invention, an optical disk apparatus for reproducing information from an optical disk having a plurality of recording layers including a first recording layer and a second recording layer, includes:

an optical pickup unit producing an optical spot on any one of the plurality of recording layers of the optical disk with the use of an objective lens, and receiving reflected light from the recording layer;

a control unit configured to, upon scanning with an optical spot from a first address on the first recording layer as a start point for a second address on the second recording layer which is a target address for reproducing in order to detect a reproduction position, select a scanning path for reaching the second address by scanning an already-recorded zone of at least one of the first recording layer and the second recording layer from a first scanning path to seek after focus jump and a second scanning path to carry out seeking before focus jump, based on a positional relationship between a known boundary position between a not-yet-recorded zone and an already-recorded zone of the first recording layer or the second recording layer and the first address; and controlling the optical pickup unit to scan with the optical spot along the scanning path; and a processing unit configured to reproduce information with the use of an output signal of the optical pickup unit.

In this configuration, since scanning with the optical spot is carried out along the already-recoded zone for the second address, address information required for the scanning can be properly obtained by the control unit during the scanning. Then, the processing unit reproduces information with the use the signal output from the optical pickup unit. Since the optical spot can be thus properly produced at the second address, information recorded in an optical disk having a plurality of recording layers and having a not-yet-recorded zone and an already-recorded zone mixed therein can be properly and stably reproduced.

In this case, in an eighth aspect of the present invention, when the already-recorded zone includes a plurality of partial zones recording user data separately; the boundary position may be an end address of the user data of the partial zone recording the user data at the last from among the plurality of partial zones.

In the seventh or eighth aspect of the present invention, in a ninth aspect of the present invention, the first scanning path may be a scanning path to carry out seeking for the second address in the second recording layer after the focus jump from the first recording layer to the second recording layer at the start point; and the second scanning path may be a scanning path to carry out seeking for the second address in the second recording layer after the focus jump from the first recording layer to the second recording layer at a third address after seeking is made from the start point in the first recording layer for the third address belonging to the first recording layer in the vicinity of the second address with respect to a radial direction of the optical disk.

In this case, in a tenth aspect of the present invention, in the second scanning path, a direction from the third address for the second address may be the same as a direction in which an address increases in the second recording layer, with respect to the radial direction of the optical disk.

In the optical disk apparatus according to any one of the seventh through tenth aspects of the present invention, in an eleventh aspect of the present invention, the control unit may select the first scanning path, when a determination address belonging to the second recording layer in the vicinity of the first address is included in the already-recorded zone with respect to the radial direction of the optical disk.

In the optical disk apparatus according to any one of the seventh through tenth aspects of the present invention, in a twelfth aspect of the present invention, the control unit may select the second scanning path, when a determination address belonging to the second recording layer in the vicinity of the first address is included in the not-yet-recorded zone with respect to the radial direction of the optical disk.

According to a thirteenth aspect of the present invention, a program applied in an optical disk apparatus for reproducing information from an optical disk having a plurality of recording layers including a first recording layer and a second recording layer, includes instructions to cause a computer, provided to control the optical disk apparatus, to carry out the step of:

upon scanning with an optical spot from a first address on the first recording layer as a start point for a second address on the second recording layer which is a target address for reproducing in order to detect a reproduction position, selecting a scanning path for reaching the second address by scanning an already recorded zone of at least one of the first recording layer and the second recording layer, from a first scanning path to carry out seeking after focus jump and a second scanning path to carry out seeking before focus jump, based on a positional relationship between a known boundary position between a not-yet-recorded zone and an already-recorded zone of the first recording layer or the second recording layer and the first address.

In this configuration, when the program according to the present invention is loaded in a predetermined memory, and a top address thereof is set in a program counter, the computer for controlling the optical disk apparatus carries out the step of:

upon scanning with an optical spot from a first address on the first recording layer as a start point for a second address on the second recording layer which is a target address for reproducing in order to detect a reproduction position, selecting a scanning path for reaching the second address by scanning an already recorded zone of at least one of the first recording layer and the second recording layer, from a first scanning path to carry out seeking after a focus jump and a second scanning path to carry out seeking before the focus jump, based on a positional relationship between a known boundary position between a not-yet-recorded zone and an already-recorded zone of the first recording layer or the second recording layer and the first address.

That is, according to the program of the present invention, the computer for controlling the optical disk apparatus can be made to carry out the reproducing method according to the first aspect of the present invention. Thereby information recorded in an optical disk having a plurality of recording layers and having a not-yet-recorded zone and an already-recorded zone mixed therein can be properly and stably reproduced.

In this case, according to a fourteenth aspect of the present invention, when the already-recorded zone includes a plurality of partial zones recording user data separately, the boundary position comprises an end address of the user data of the partial zone recording the user data at the last from among the plurality of partial zones.

In the program according to the thirteenth or fourteenth aspect of the present invention, according to a fifteenth aspect of the present invention, the first scanning path may be a scanning path to carry out seeking for the second address in the second recording layer after focus jump from the first recording layer to the second recording layer at the start point; and the second scanning path may be a scanning path to carry out seeking for the second address in the second recording layer after focus jump from the first recording layer to the second recording layer at a third address after seeking is made from the start point in the first recording layer for the third address belonging to the first recording layer in the vicinity of the second address with respect to a radial direction of the optical disk.

In this case, according to a sixteenth aspect of the present invention, in the second scanning path, a direction from the third address for the second address may be the same as a direction in which an address increases in the second recording layer, with respect to the radial direction of the optical disk.

In the program according to any one of the thirteenth through sixteenth aspects of the present invention, according to a seventeenth aspect of the present invention, the program may include instructions for causing the computer to control the optical disk apparatus to carry out, as the above-mentioned step of selecting, a step of selecting the first scanning path when a determination address belonging to the second recording layer in the vicinity of the first address is included in the already-recorded zone with respect to the radial direction of the optical disk.

In the program according to any one of the thirteenth through sixteenth aspects of the present invention, according to an eighteenth aspect of the present invention, the program may include instructions for causing the computer to control the optical disk apparatus to carry out, as the step of selecting, a step of selecting the second scanning path when a determination address belonging to the second recording layer in the vicinity of the first address is included in the not-yet-recorded zone with respect to the radial direction of the optical disk.

According to a nineteenth aspect of the present invention, a computer readable information recording medium may store therein the program according to any one of the thirteenth through eighteenth aspects of the present invention.

In this configuration, since the computer readable recording medium stores therein the program according to any one of the thirteenth through eighteenth aspects of the present invention, information recorded in an optical disk having a plurality of recording layers and having a not-yet-recorded zone and an already-recorded zone mixed therein can be properly and stably reproduced by the optical disk apparatus, as a result of the program being carried out by a computer provided for controlling the optical disk apparatus.

BRIEF DESCRIPTION OF THE DRAWINGS

Other objects and further features of the present invention will become more apparent from the following detailed description when read in conjunction with the accompanying drawings:

FIG. 1 shows a block diagram of a configuration of an optical disk apparatus according to an embodiment of the present invention;

FIGS. 2A through 2C illustrate layouts of information areas in commercially available DVD-ROMs;

FIGS. 5A through 5C illustrate management information in a multi-session recording way, respectively;

FIG. 7 shows a flow chart of boundary position obtaining processing for the optical disk shown in FIG. 1;

BEST MODE FOR CARRYING OUT THE PRESENT INVENTION

Figure 3:
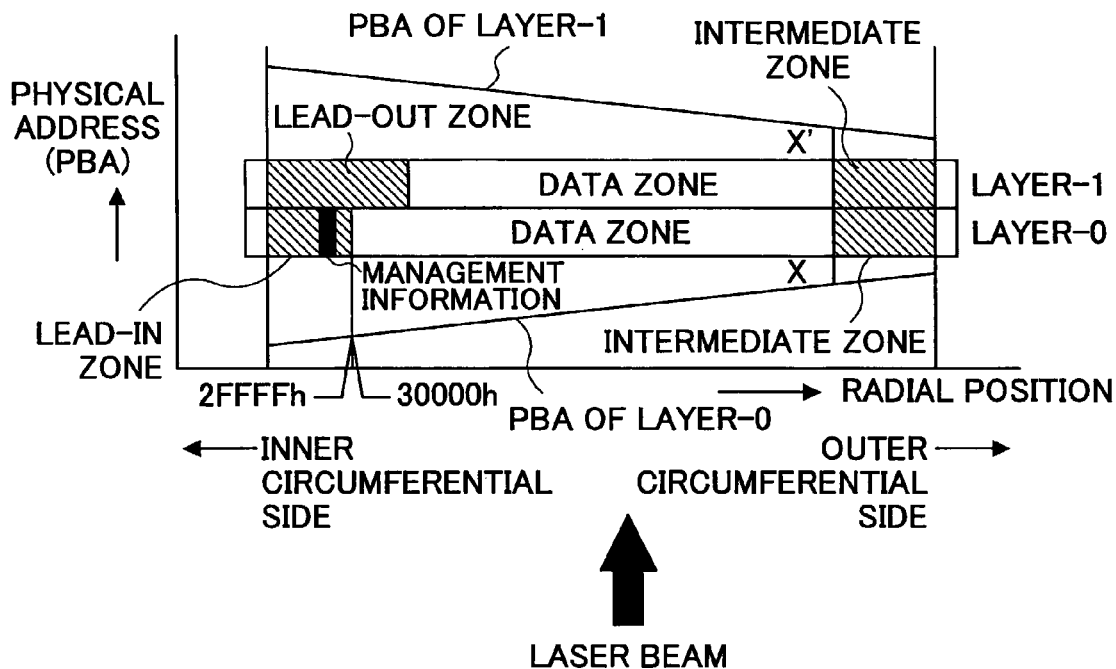
FIG. 3 illustrates a layout of an information area in an optical disk shown in FIG. 1.

An embodiment of the present invention is now described with reference to FIGS. 1 through 14C. FIG. 1 shows a general configuration of an optical disk apparatus 20 according to an embodiment of the present invention.

The optical disk apparatus shown is an information processing apparatus, includes a spindle motor 22 for driving and rotating an optical disk 15 having a plurality of recording layers each having spiral or concentric tracks produced thereon, an optical pickup unit 23, a seek motor 21, a laser control circuit 24, a driving control circuit 26, a reproduced signal processing circuit 28, a buffer RAM 34, a buffer manager 37, an interface 38, a flash memory 39, a CPU 40 and a RAM 41, and reproduces information recorded in the optical disk 15. Arrows shown in FIG. 1 merely show flows of typical signals or information, and do not necessarily show all the connection relationship among the respective blocks. Further, the optical disk apparatus 20 has a function to handle both the above-mentioned single-side double-layer DVD-ROM and the above-mentioned single-side double-layer DVD+R.

The optical pickup unit 23 is a device for focusing laser light on any recording layer (referred to as a 'target recording layer'. hereinafter) of the plurality of recording layers of the optical disk 15, and also, receiving reflected light therefrom. The optical pickup unit 23 is configured to include a semiconductor laser, an objective lens for condensing a light flux emitted by the semiconductor laser on the target recording layer, a light receiving device receiving returning light reflected by the target recording layer and a driving system (a focusing actuator and a tracking actuator) driving the objective lens (each of which is not shown). The light receiving device includes a plurality of light receiving elements (or a plurality of light receiving zones), generates a signal (photoelectric signal) according to a light receiving amount for each light receiving device (or light receiving zone), and outputs these signals to the reproduced signal processing circuit 28. The focusing actuator is provided to drive the objective lens in an optical axis direction thereof. The tracking actuator is provided to drive the objective lens in a tracking direction perpendicular to any one of a track tangential direction and the optical axis direction of the objective lens.

The seek motor 21 is provided to drive the optical pickup unit 23 in a sledge direction. Operation of driving the optical pickup unit 23 via the seek motor 21 to produce an optical spot in the vicinity of a target position is called coarse seeking operation, or simply, coarse seeking.

The reproduced signal processing circuit 28 obtains a servo signal (a focus error signal, a tracking error signal and so forth) and an RF signal in the same manner as that of an optical disk apparatus in the prior art, based on the output signal of the light receiving devise (the plurality of photoelectric signals). The thus-obtained servo signal is output to the driving control circuit 26. Further, the reproduced signal processing circuit 28 carries out decoding processing, error detecting processing and so forth on the RF signal. When error is found out there, error correction processing is carried out. After that, the RF signal is stored in the buffer RAM 34 via the buffer manager 37 as reproduced data. Address information included in the reproduced data is output to the CPU 40.

The driving control circuit 26 generates a driving signal for the tracking actuator based on the tracking error signal, for the reproduced signal processing circuit 28 for correcting positional error of the objective lens with respect to the tracking direction. Further, the driving control circuit 26 generates a driving signal for the focusing actuator based on the focus error signal from the reproduced signal processing circuit 28 for correcting a focus error of the objective lens. The thus-generated respective driving signals are output to the optical pickup unit 23. Thereby, tracking control and focus control are carried out. Operation of driving the tracking actuator to shift the objective lens and produce the optical spot at the target position is called fine seeking operation, or simply, fine seeking.

The driving control circuit 26 generates a driving signal for driving the focusing actuator according to a so-called 'focus jump' instruction to change a position to produce the optical spot from one recording layer to another recording layer with respect to the optical axis direction of the objective lens. The thus-generated driving signal is output to the optical pickup unit 23.

Further, the driving control circuit 26 generates a driving signal for driving the seek motor 21 and a driving signal for driving the spindle motor 22 based on instructions from the CPU 40. The respective driving signals are output to the seek motor 21 and the spindle motor 22, respectively.

In the buffer RAM 34, data (reproduced data) reproduced from the optical disk 15 is temporary stored. Input/output to/from the buffer RAM 34 is managed by the buffer manager 37.

The laser control circuit 24 controls light emission power of the semiconductor laser included in the optical pickup unit 23. Specifically, a driving signal for the semiconductor laser is generated, and is output to the optical pickup unit 23.

The interface 38 is a bi-directional interface between a host apparatus 90 (for example, a personal computer) and the optical disk apparatus 20, and conforms to standard interfaces such as ATAPI (AT attachment packet interface), SCSI (small computer system interface), USB (universal serial bus) and so forth.

The flash memory 39 stores various types of programs including programs according to the present invention, described by code interpretable by the CPU 40, semiconductor laser light emitting characteristics, and so forth.

The CPU 40 controls the respective parts mentioned above according to the programs store in the flash memory 39, and also, stores data necessary for the control in the RAM 41 and the buffer RAM 34.

A DVD-ROM as a currently commercially available information recording medium provided only for reproduction is described briefly (see ECMA-267). The DVD-ROM includes a single-layer DVD-ROM having a single recording layer and a single-side double-layer DVD-ROM mentioned above. The single-side double-layer disk includes those, with respect to a track path (reproducing scanning path), a parallel track path (refereed to as 'PTP', hereinafter) type and an opposite track path (referred to as 'OTP' hereinafter) type.

In the single-layer DVD-ROM, as shown in FIG. 2A, an information area which is separated into a lead-in zone, a data zone and a lead-out zone is provided, from an inner circumferential side to an outer circumferential side of the optical disk, in a recording layer. A physical address (PBA) increasing continuously from the lead-in zone for the lead-out zone, i.e., from the disk inner circumferential side to the outer circumferential side, is given. A direction of a track path in this case is a direction from the lead-in zone for the lead-out zone.

In the single-side double-layer DVD-ROM according to the above-mentioned PTP type, as shown in FIG. 2B, an information area separated into a lead-in zone, a data zone and a lead-out zone is provided in each recording layer from the disk inner circumferential side to the disk outer circumferential side, That is, in the DVD-ROM in the PTP type, the information area is provided separately for each recording layer, and each information area can be regarded as a separate recording layer from each other. In each recording layer, a physical address increasing continuously from the lead-in zone for the lead-out zone, is given. A direction of a track path in this case is a direction from the lead-in zone for the lead-out zone.

Further, in the PTP-type single-side double-layer DVD-ROM, as shown in FIG. 2B, a start position and an end poison of the lead-in zone, a start position of the data zone and an end potion of the lead-out zone are the same in their radial positions between the respective recording layers. On the other hand, start potions of the lead-out zones, i.e., end positions of the data zones, may be different between the respective recording layers. When the end positions of the data zones are different between the respective recording layers as shown in FIG. 2B, lead out is recorded in a differential zone therebetween. It is noted that, the radial position means a position with respect to the disk's radial direction, measured from the disk's rotational center.

On the other hand, in the OTP-type single-side double-layer DVD-ROM, as shown in FIG. 2C, in a layer-0, a lead-in zone, a data zone and an intermediate zone are provided from the disk inner circumferential side to the disk outer circumferential side, while, in a layer-1, from the disk outer circumferential side for the disk inner circumferential side, an intermediate zone, a data zone and a lead-out zone are provided. For the layer-0, a physical address continuously increasing from the lead-in zone for the intermediate zone is given, while, for the layer-1, a physical address inverted in bits from that of the physical address of the layer-0 is given from the intermediate zone for the lead-out zone. That is, in the layer-1, the physical address continuously increases from the intermediate zone for the lead-out zone. A direction of a track path in this case is a direction from the lead-in zone for the intermediate zone in the layer-0, while, is a direction from the intermediate zone for the lead-out zone in the layer-1. Accordingly, the layer-0 and the layer-1 can be regarded as a continuous single layer.

Further, in the OTP-type single-side double-layer DVD-ROM, a start position of the leads-in zone and an end position of the lead-out zone are the same in their radial positions; an end position of the data zone in the layer-0 and a start position of the data zone in the layer-1 are the same in their radial positions; and start positions and end positions of the intermediate zones are the same in their radial positions between the respective recording layers. On the other hand, a start position of the data zone in the layer-0 and an end position of the data zone in the layer-1 are not necessarily coincident in their radial positions. Also in this case, lead out is recorded in a differential zone therebetween, the same as the PTP-type single-side double-layer DVD-ROM.

Next, the above-mentioned optical disk 15 applied in the present embodiment is described. This optical disk 15 is a double-layer disk conforming to the standard of the above-mentioned single-side double-layer DVD+R. The single-side double-layer DVD+R is compatible with the above-mentioned OTP-type single-side double-layer DVD-ROM. It is noted that, hereinafter, a DVD+R having a single recording layer is referred to as a 'single-layer DVD+R'.

As shown in FIG. 3 for example, the optical disk 15 is provided with a lead-in zone, a data zone and an intermediate zone in a layer-0 from the disk inner circumferential side to the disk outer circumferential side, while, in a layer-1, from the outer disk circumferential side to the disk inner circumferential side, an intermediate zone, a data zone and a lead-out zone are provided. In the layer-0, a physical address continuously increasing from the lead-in zone for the intermediate zone is given, while, in the layer-1, a physical address inverted in bits from that of the layer-0 is given from the intermediate zone for the lead-out zone. That is, in the layer-1, the physical address increases from the intermediate zone for the lead-out zone, i.e., from the disk outer circumferential side to the disk inner circumferential side. It is noted that, the optical disk 15 is set in the optical disk apparatus 20 in such a manner that the recording layer nearer to the optical pickup unit 23 may be the layer-0. In this case, a direction of a track path corresponds to, the same as in the single-side double-layer DVD-ROM in the OTP type, a direction from the lead-in zone for the intermediate zone in the layer-0, while, a direction from the intermediate zone for the lead-out zone in the layer-1.

In the optical disk 15, the following two alternative types of scanning paths (a first scanning path and a second scanning path) are applicable for scanning with an optical spot from a current address (first address) in one of the recording layers, i.e., the layer-0 and the layer-1 (first recording layer), as a start point, for a target address on the other recording layer (second recording layer). A specific example of each scanning path is described below with reference to FIGS. 4A and 4B for a case of scanning with an optical spot from a current address on the layer-0 for a target address on the layer-1.

Figure 4A:
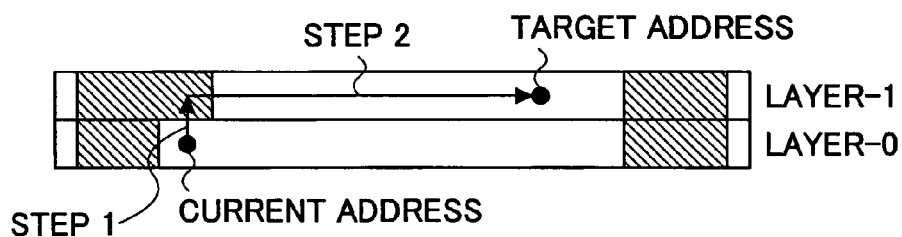
FIGS. 4A and 4B illustrate scanning paths in the optical disk shown in FIG. 1, respectively.

In the first scanning path, as one example, as shown in FIG. 4A, first the focusing actuator is driven, focus jump is carried out at a current address, and thus, a focus position of an optical spot with respect to the optical axis direction of the objective lens is changed from the layer-0 to the layer-1 (Step 1). Next, seeking is carried out on the layer-1 for the target address (Step 2). In Step 2, the above-mentioned fine seeking is carried out when a seeking distance is so short that merely a shift by the tracking actuator may achieve it. On the other hand, the above-mentioned coarse seeking is carried out, and then, the fine seeking is carried out, when a seeking distance is so long that merely a shift by the tracking actuator may not achieve the seeking distance.

Figure 4B:
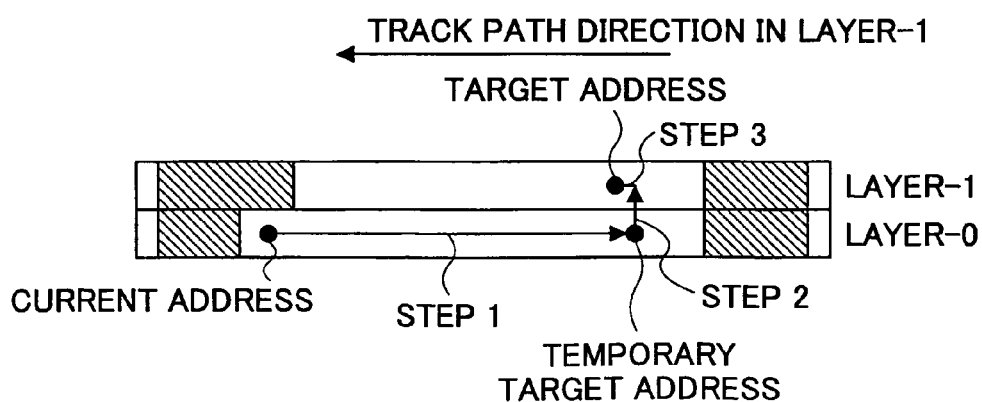

In the second scanning path, as shown in FIG. 4B as one example, first an address on the layer-0 in the vicinity of the radial position of the target address is set as a temporary target address (third address), and seeking is carried out for the temporary target address on the layer-0 (Step 1). In Step 1, in order to shorten a seek time, only coarse seeking is carried out. Next, at the temporary target address, focus jump to the layer-1 is carried out (Step 2). After that, fine seeking is carried out for the target address on the layer-1 (Step 3).

Further, in the single-side double-layer DVD+R, the same as in a case of a single-layer DVD+R (see ECMA-349, for example), a multi-track, multi-session recording way is applied. The multi-session recording way of the optical disk 15 is briefly described below. It is noted that, recording of user data is carried out on the layer-0 in prior to that on the layer-1.

In the multi-session recording way, a first session is made of lead in, user data and closure. Each of sessions starting from a second session is made of intro, user data and closure. A last session is made of intro, user data and lead out.

Management information in the multi-session recording way includes, as shown in FIG. 5A, 'identification ID', 'restriction information for unknown identification ID', 'drive ID', 'session number', a plurality of (in the example of FIG. 5A, N+1) 'session items', and 'reserved'. The identification ID stores an identification ID of the management information. The restriction information for unknown identification ID stores information concerning operation which a drive apparatus should restrict when the identification ID is unknown. As the restriction information, for example, information for inhibiting recording to the data zone, information for inhibiting rewriting of the management information, or such, may be applied. The session number stores a number of a session in which the management information is recorded. The session item stores information concerning sessions or fragments recorded in the disk, and includes a fragment item storing information concerning a fragment's recorded position in the disk and a previous session item storing information concerning a recorded position of a session preceding the relevant session. The reserved is a zone reserved for a future use.

The fragment item includes, as shown in FIG. 5B, 'fragment item ID', 'fragment number', 'fragment start address', fragment end address', and 'reserved'. The fragment item ID stores the identification ID of the management information. The fragment number stores a number of a fragment managed by the management information. The fragment start address stores a start address of the fragment managed by the management information. The fragment end address stores an end address of the fragment managed by the management information. The reserved is a zone reserved for a future use.

The previous session item is, as shown in FIG. 5C, information concerning the session preceding the relevant session, and includes 'previous session item ID', 'previous session number', 'previous session start address', previous session end address', and 'reserved'. The previous session item ID' stores the identification ID of the management information. The previous session number stores a number of a session managed by the management information. The previous session start address stores a start address of the session managed by the management information. The previous session end address stores an end address of the session managed by the management information. The reserved is a zone reserved for a future use.

Figure 6A:
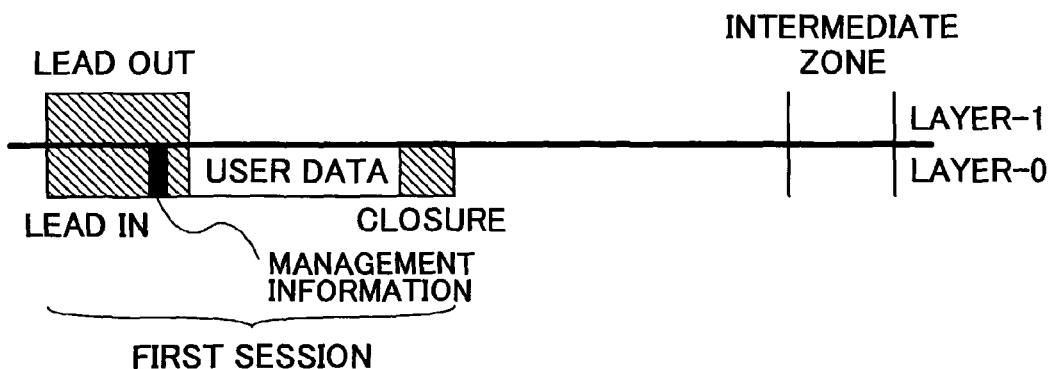
FIGS. 6A through 6C illustrate a multi-session recording way for a double-layer DVD+R, respectively.

FIG. 6A shows a state in which, user data is recorded in the first session, and then, the session is closed. Then, management information including information (start addresses and end addresses) concerning recorded positions of fragments included in the first session is recorded in a management information zone in the lead in. Further, predetermined information is recorded in the lead-out zone of the layer-1.

Figure 6B:
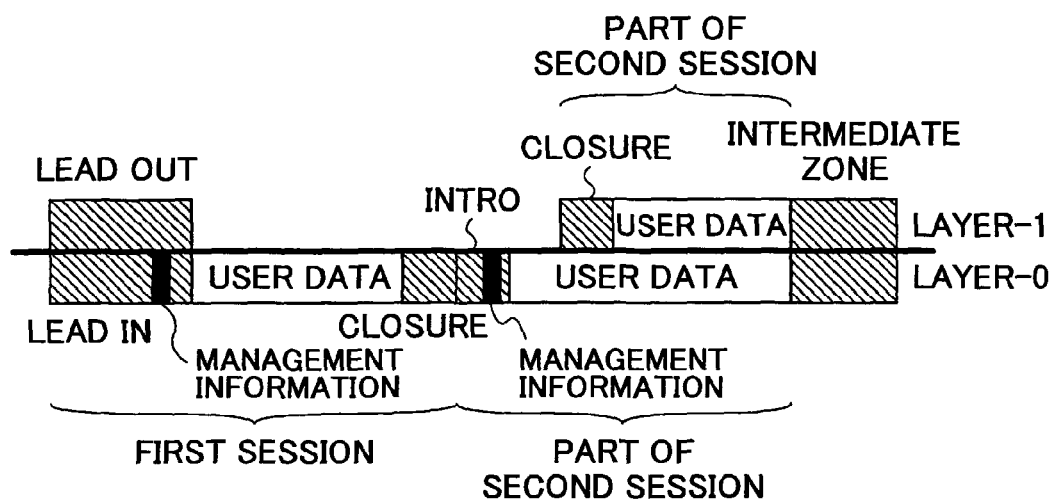

Then, a subsequent session (second session) is additionally recorded with the use of both recording layers, i.e., the layer-0 and the layer-1, and the session is closed. FIG. 6B shows this state. There, the user data is recorded with the use of both the recording layers. In this case, in the intermediate zones of the respective recording layers, data indicating that these zones are intermediate zones is recorded, respectively. Then, management information including information (start addresses and end addresses) concerning recorded positions of fragments included in the second session and the information (the start address and the end address) concerning the recorded position of the first session are recorded in a management information zone in intro of the second session.

Figure 6C:
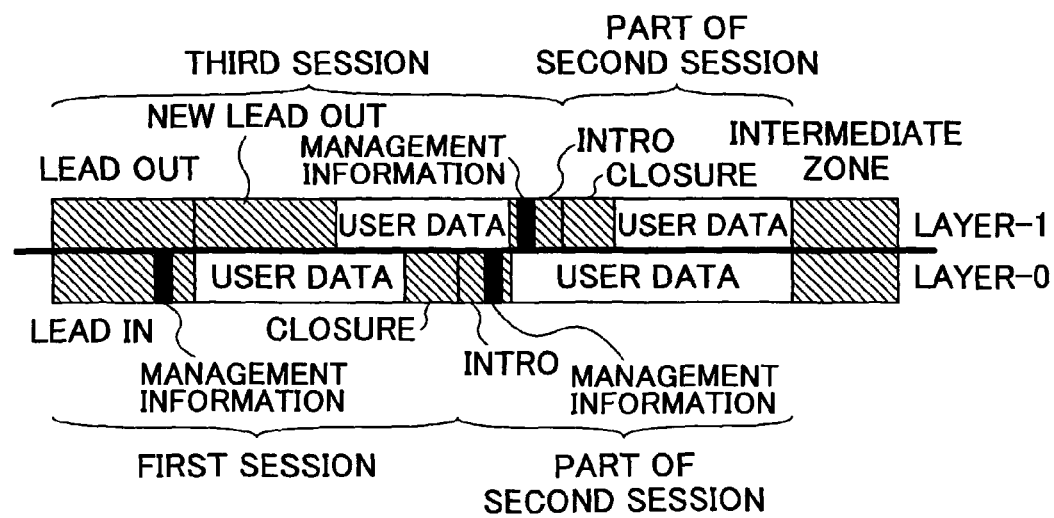

A further subsequent session (third session) is additionally recorded, and then finalization is carried out. FIG. 6C shows this state. This third session is recorded in a zone subsequent to the second session, i.e., a zone on the inner circumferential side, and is a last session. Then, management information including information (start addresses and end addresses) concerning recorded positions of fragments included in the third session, the information (the start address and the end address) concerning the recorded position of the second session and the information (the start address and the end address) concerning the recorded position of the first session are recorded in a management information zone in intro of the third session. In a not-yet-recorded zone subsequent to the third session, new lead out is recorded, and thus, the entirety of the information area thus becomes an already-recorded zone in this optical disk.

Next, description is made, with reference to FIG. 7, as one example, for processing to obtain information concerning a boundary position (simply referred to as a 'boundary position obtaining processing', hereinafter) between a not-yet-recorded zone and an already-recorded zone, carried out by the optical disk apparatus 20, when the optical disk 15 in which second session is recorded subsequent to a first session, and the second session is closed (see FIG. 6B), that is, the optical disk 15 in which, the entire data zone of the layer-0 is the already-recorded zone, while, in the layer-1, the not-yet-recorded zone remains as a part of the data zone (the inner circumferential side), is set in the optical disk apparatus 20 configured as described above. A flow chart of FIG. 7 corresponds to a sequence of a processing algorithm carried out by the CPU 40. It is noted that, this boundary portion obtaining processing is carried out after, for example, ordinary predetermined initialization processing is finished, in the present embodiment.

When the optical disk 15 is set, a start address of a program (referred to as a 'boundary position processing program', hereinafter) corresponding to the flow chart of FIG. 7 stored in the flash memory 39 is set in the program counter of the CPU 40, and the boundary position obtaining processing starts.

At first, in Step 301, a management information parameter, held by the RAM 41 for identifying a boundary position, is initialized. Specifically, for example, 'FFFFFFh' is set there.

Then, in Step 303, 1 is set in a counter S indicating a session number.

Then, in Step 305, reproduction of a management information zone of a S-th session is directed. Since S=1 in this case, a management information zone of lead in is reproduced.

In Step 307, it is determined whether or not reproduction of the management information zone has been finished properly. In this case since the management information is positively recorded in the management information zone of the lead in, the determination result is Yes, and Step 309 is then executed.

Figure 8A:
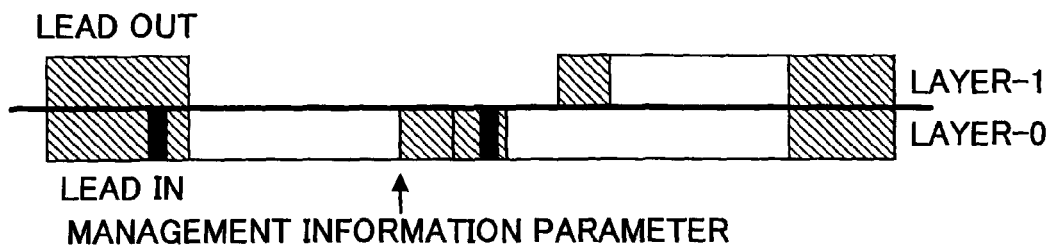
FIGS. 8A through 8D illustrate the boundary position obtaining processing of FIG. 7.

In Step 309, an end address of a fragment having the largest fragment number in the management information thus reproduced is set in the management information parameter. In this case, as shown in FIG. 8A for example, an end address of a zone in which user data of a first session is recorded, is set in the management information parameter.

In Step 311, the value of the counter S is incremented by 1. As a result, S=2.

In Step 313, a position of a management information zone of a S-th session (in this case, a second session) is calculated. In DVD+R, sizes of closure and intro are the same throughout all the sessions, and also, a position of the management information zone in the intro is fixed. Accordingly, the position of the management information zone of the S-th session can be calculated based on the management information parameter. Then, Step 305 is returned to.

In Step 305, a management information zone of intro of the second session is reproduced.

In this case, since the second session actually exists, the determination result becomes Yes in Step 307.

Figure 8B:
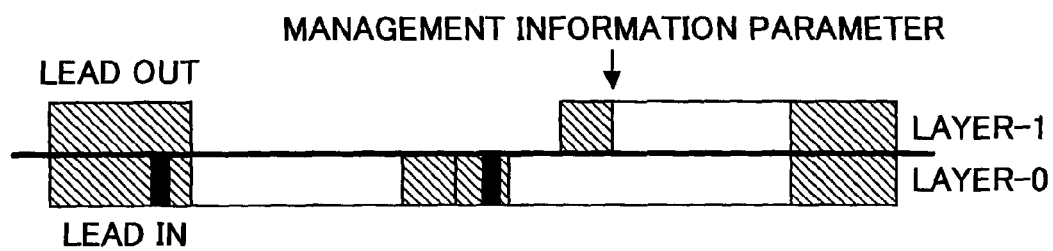

Then, in Step 309, as shown in FIG. 8B for example, an end address of a zone in which user data is recorded in the second session is set in the management information parameter. That is, the management information parameter is thus updated.

In Step 311, the value of the counter S is incremented by 1. As a result, S=3.

In Step 313, a position of a management information zone in a S-th session (in this case, a third session) is calculated. Then, Step 305 is returned to.

In Step 305, a management information zone in intro of the S-th session (third session) is reproduced.

Figure 8C:
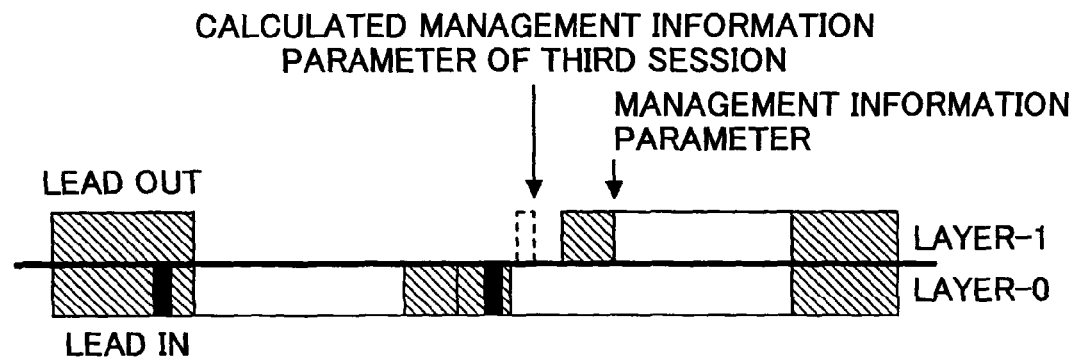

In this case, as shown in FIG. 8C for example, since no third session actually exists, reproduction error occurs, and thus, the determination result in Step 307 becomes No. Then, Step 315 is executed in this case.

In Step 315, the (S−1)-th session (in this case, the second session) is determined as a last session.

Figure 8D:
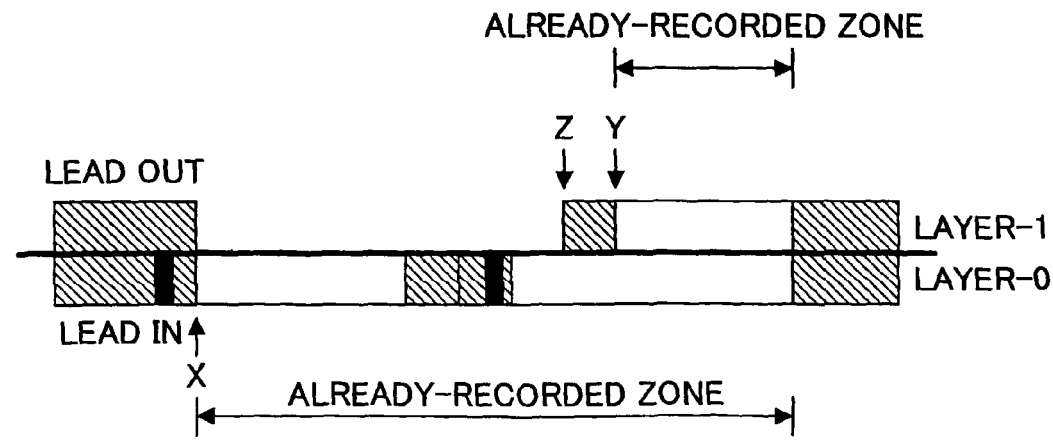

In Step 317, as shown in FIG. 8D for example, it is determined that a zone starting from a top address (referred to as X) of the data zone in the layer-0 up to an address (referred to as Y) stored in the management information parameter, is an already-recorded zone. In this embodiment, a zone in which closure is recorded (referred to as a 'closure zone', hereinafter) in the last session is regarded as a not-yet-recorded zone. This is in order to avoid a possibility that access to a not-yet-recorded zone may occur, due to a possible positional error which may occur curing a manufacturing process where the recording layers are stuck together, upon focus jump from the layer-0 to the layer-1 in the vicinity of an end address (referred to as Z) of the closure zone. However, actually, data is recorded up to the end address Z of the closure zone, and thus, a zone starting from the address X up to the address Z may be determined as an already-recorded zone instead when such a possibility, as that mentioned above, is low. In this case, the end address Z of the closure zone is stored in the management information parameter. It is noted that, information (the address X and the address Y) concerning the thus-determined already-recorded zone is stored in the RAM 41 as the already-recorded zone information. Then, the boundary position obtaining processing is finished. That is, a boundary between the already-recorded zone (in this example, the above-mentioned already-recorded zone between the address X and the address y) and the not-yet-recorded zone (in this case a zone between the address Y and the start address of the lead out, in FIG. 8D) is thus obtained.

Next, operation of the optical disk apparatus 20 carried out when the host apparatus 90 issues a reproduction request command for the optical disk 15 for which the above-mentioned boundary position obtaining processing has been finished is described with reference to FIG. 9. A flow chart of FIG. 9 corresponds to a sequence of a processing program executed by the CPU 40.

Figure 9:
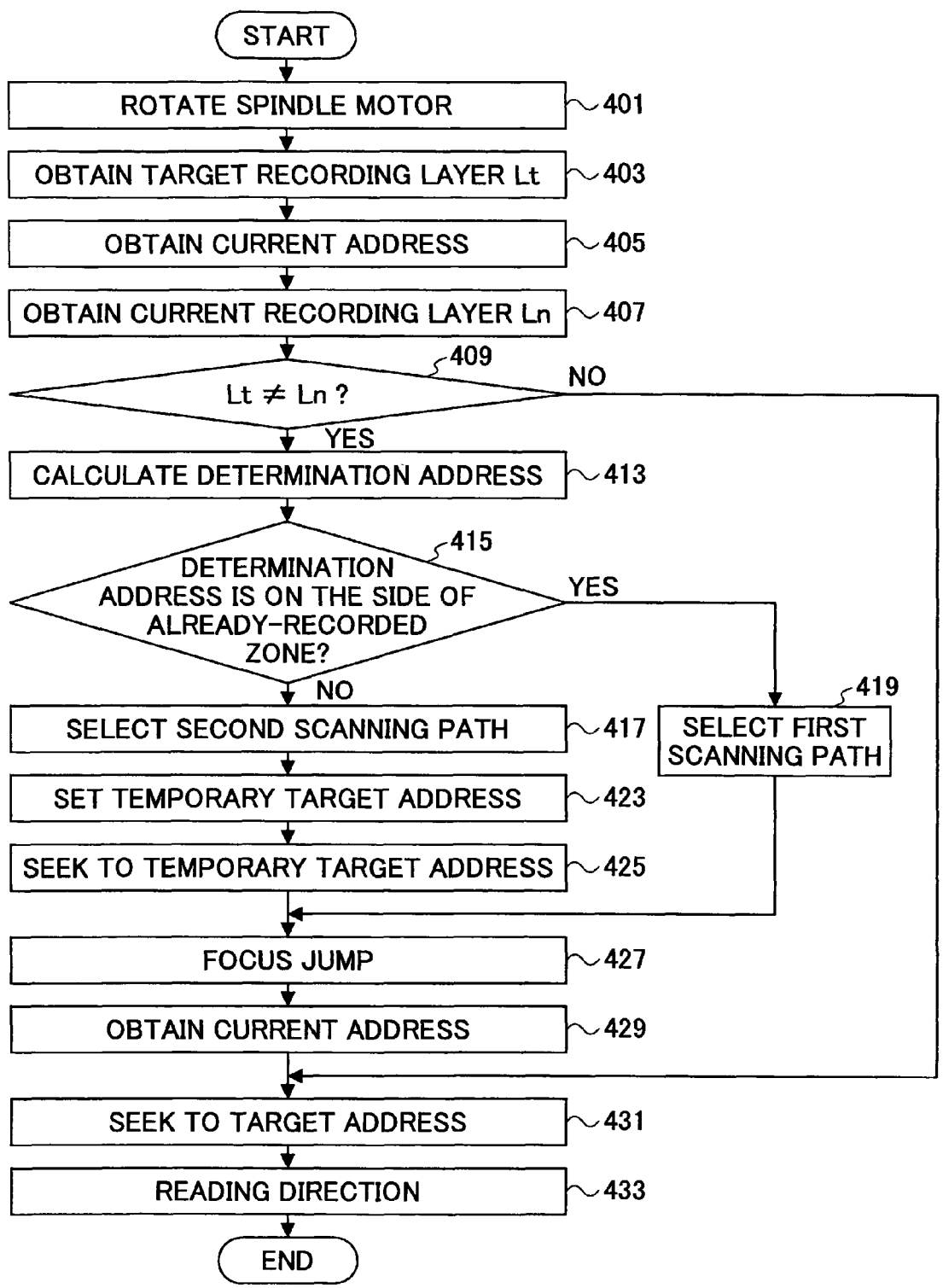
FIG. 9 shows a flow chart illustrating processing of reproducing from the optical disk of FIG. 1.

When receiving the reproduction request command from the host apparatus 90, a start address of a program (refereed to as a 'reproduction processing program', hereinafter) corresponding to the flow chart of FIG. 9 is set in the program counter of the CPU 40. Thus, reproduction processing starts.

First, in Step 401, a control signal for controlling a rotation of the spindle motor 22 is generated based on a reproduction speed, is output to the driving control circuit 26, and also, a matter that the reproduction request command has been received from the host apparatus 90 is notified of to the reproduced signal processing circuit 28. Thereby, when the rotation of the optical disk 15 has reached a linear velocity corresponding to the reproduction speed, the above-mentioned tracking control and focus control are carried out. The tracking control and focus control are carried out as is necessary until the reproduction processing is finished.

In Step 403, an address attached to the reproduction request command (referred to as a target address) is extracted therefrom, and a recording layer (referred to as a target recording layer Lt) to which the target address belongs is obtained.

In Step 405, based on address information from the reproduced signal processing circuit 28, an address (referred to as a current address) of a zone on which an optical spot is currently produced is obtained.

In Step 407, a recording layer (referred to as a current recording layer Ln, hereinafter) to which the current address belongs is obtained.

In Step 409, it is determined whether or not the target address Lt and the current address Ln are different from one another. When both addressees Lt and Ln are different from one another, the determination result becomes Yes, and Step 413 is executed then.

In Step 413, an address belonging to the target recording layer Lt in the vicinity of a radial position of the current address is calculated, and the thus-obtained address is referred to as a determination address.

Figure 10A:
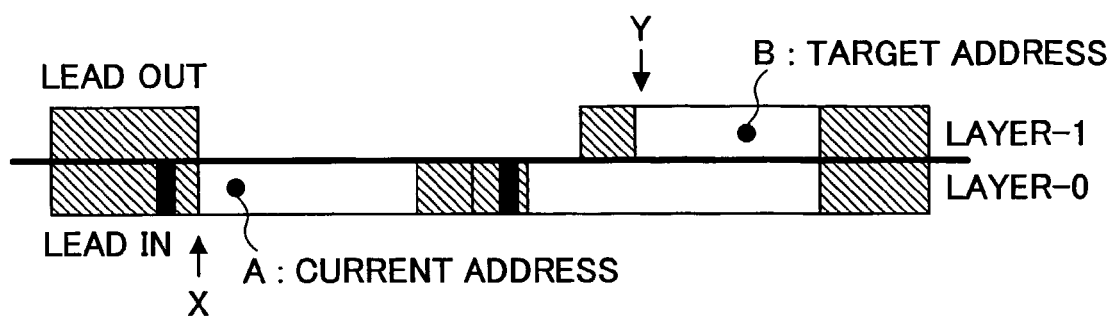
FIGS. 10A through 10D and FIGS. 11A through 11C illustrate reproducing processing of FIG. 9.
Figure 10B:
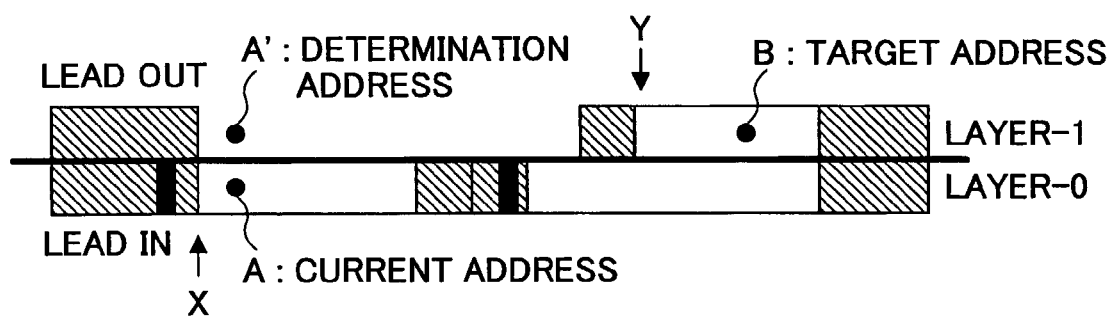

In Step 415, the above-mentioned already-recorded recording zone information stored in the RAM 41 is referred to, and it is determined whether to not the above-mentioned determination address is included in the already-recorded zone. For example, as shown in FIG. 10A for example, when the current address (in this case, an address A) is in the vicinity of the above-mentioned address X on the layer-0, and the target address (in this case, an address B) belongs to the layer-1, the determination address (in this case, an address A') is included in a not-yet-recorded zone as shown in FIG. 10B. As a result, the determination result in Step 415 become No. As a result, Step 417 is executed then.

In Step 417, the second scanning path is selected from the above-mentioned first and second scanning paths.

Figure 10C:
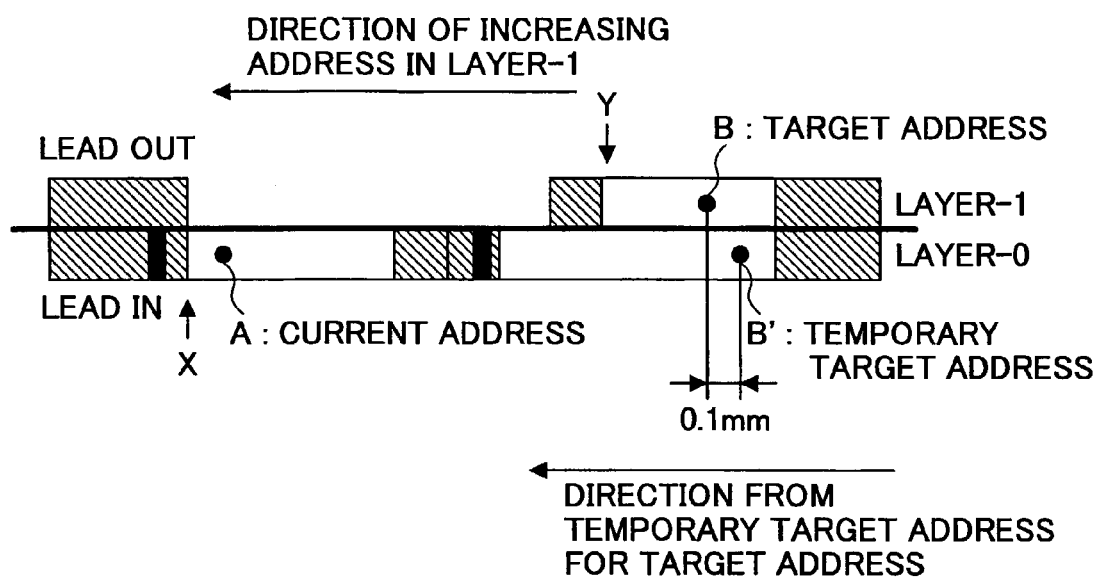

In Step 423, an address in the vicinity of a position having the same radial position as that of the target address in the current recording layer Ln is set as a temporary target address. In this case, as one example, as shown in FIG. 10C, an address (in this case, an address B') at a position on the layer-0 shifted on the outer circumferential side by approximately 0.1 mm from the radial position of the target address is set as the temporary target address. This is in order that, a direction from the temporary target address for the target address with respect to the optical disk radial direction may coincide with a direction of an address increasing in the layer-1.

Generally speaking, an optical disk having a plurality of recording layers is manufactured as a result of the recording layers produced separately being stuck to each other. Relative positional relationship among the respective recording layers may deviate from a designed one when they are stuck to each other. Even when this deviation may fall within an allowable range, a recording layer in which an actual radial position does not coincide with a designed radial position obtained from an address may occur. Accordingly, if the same radial position as that of the target address is set as that of the temporary target address, an address of an optical spot after focus jump may not coincide with the target address. Especially, when the target address is close to a not-yet-recorded zone, the not-yet-recorded zone may be accessed as a result of the focus jump. Therefor, according to the present embodiment, the direction from the temporary target address for the target address with respect to the optical disk radial direction is made to coincide with the direction of the address increasing as mentioned above. For example, when the address in the target recording layer increases from the outer circumferential side to the inner circumferential side, the temporary target address is set on the outer circumferential side of the target address in the optical disk radial direction. On the other hand, when the address in the target recording layer increases from the inner circumferential side to the outer circumferential side (for example, for a case of an optical disk of a PTP type), the temporary target address is set on the inner circumferential side of the target address in the optical disk radial direction. Thereby, a situation in which a not-yet-recorded zone is accessed from focus jump is avoided even when the target address is close to the not-yet-recorded zone.

In Step 425, a direction for coarse seeking for the above-mentioned temporary target address is given to the driving control circuit 26.

In Step 427, when it is confirmed that coarse seeking to the temporary target address has been carried out, based on address information from the reproduced signal processing circuit 28, the driving control circuit 26 is directed to carry out focus jump to the layer-1.

In Step 429, based on address information from the reproduced signal processing circuit 28, an address of a zone in which an optical spot is currently produced is obtained.

Figure 10D:
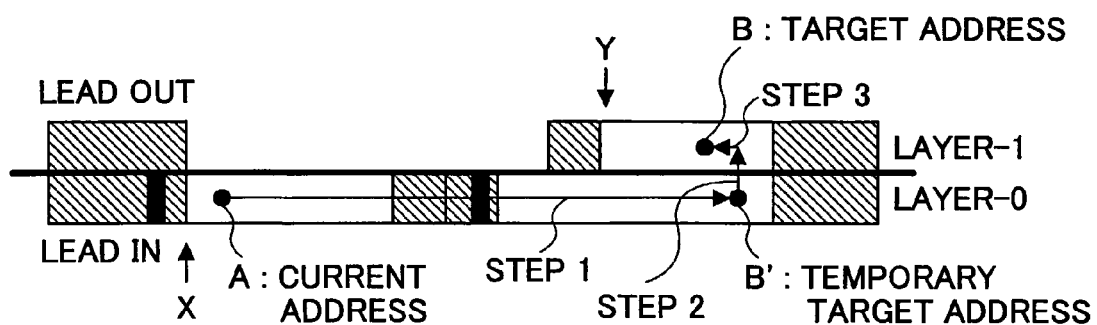

In Step S431, the driving control circuit 26 is directed to carry out fine seeking to the target address. That is, when the target recording layer Lt and the current recording layer Ln are different from one another, and the determination address is included in the not-yet-recorded zone, the second scanning path is selected. As a result, the target address is reached by the following three steps, i.e., (1) coarse seeking to the temporary target address, (2) focus jump and then (3) fine seeking to the target address, as shown in FIG. 10D for example.

Then, in Step 433, when it is confirmed from address information from the reproduced signal processing circuit 28 that seeking to the target address has been achieved, the reproduced signal processing circuit 28 is directed to carry out actual data reading. As a result, the reproduced signal processing circuit 28 obtains reproduced data, which is then stored in the buffer RAM 34. The reproduced data is then transferred to the host apparatus 90 in sector units via the buffer manager 37 and the interface 38. When data reproduction is thus completed for data designated by the host apparatus 90, predetermined finish processing is carried out, and the reproduction processing is finished.

Figure 11A:
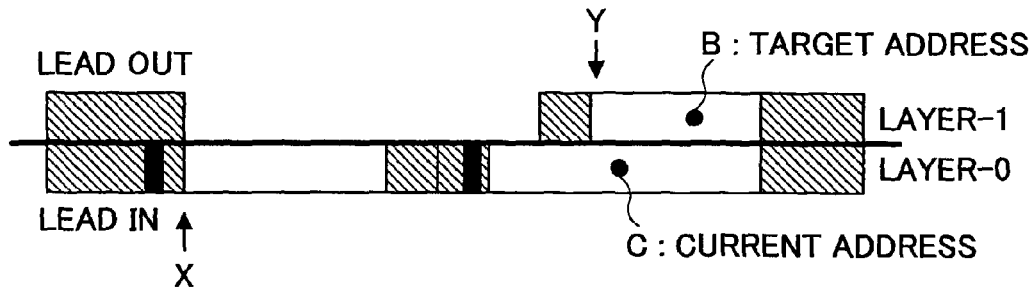
Figure 11B:
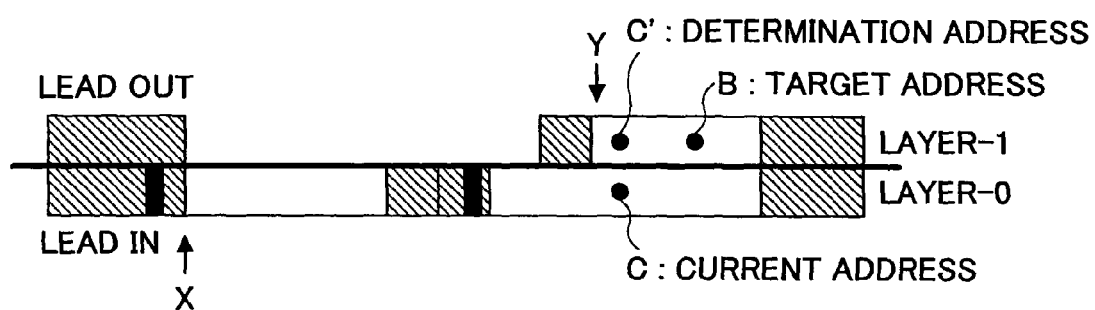
Figure 11C:
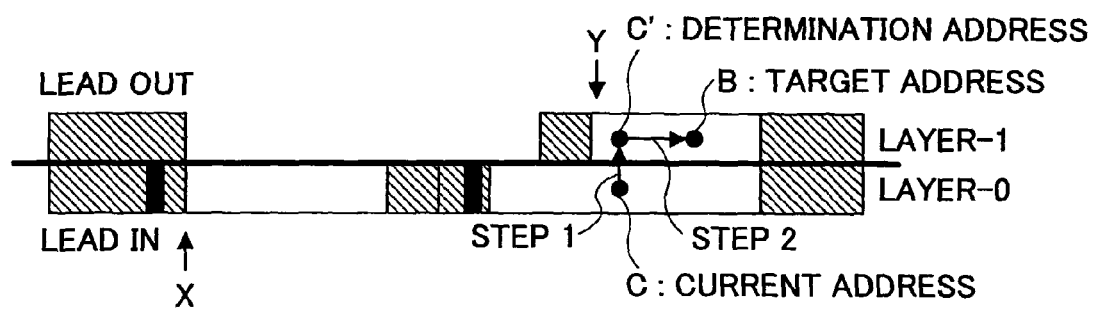

On the other hand, for a case where, as shown in FIG. 11A for example, a current address (in this case, an address C) is an address on the layer-0, and also, is an address on the outer circumferential side of the above-mentioned address Y, and a target address (in this case, an address B) is an address on the layer-1, the determination address (in this case, an address C') is included in the not-yet-recorded zone as shown in FIG. 11B. Therefore, the determination result in Step 415 is Yes, and Step 419 is carried out then. In Step 419, the first scanning path is selected from the first and second scanning paths. Then, Step S427 is carried out. In this case, focus jump to the layer-1 is carried out at the current address. Then, in Step 429, the driving control circuit 26 is directed to carry out seeking from the focus jump position to the target position. In this case, when a seeking distance from the focus jump position to the target position is so short that only a shift of the objective lens by the tracking actuator may achieve the distance as mentioned above, fine seeking is carried out. On the other hand, when a seek distance is so long that only a shift of the objective lens by the tracking actuator may not achieve the distance, coarse seeking is carried out first and after that, fine seeking is carried out. That is, for a case where the target recording layer Lt and the current recording layer Ln are different from one another, and the determination address is included in the already-recorded zone, the above-mentioned first scanning path is selected. As a result, as shown in FIG. 11C for example, the target address is reached through two steps, i.e., (1) focus jump and then (2) seeking to the target address.

When the target recording layer Lt and the current recording layer Ln are the same as one another in Step 409, the determination result there becomes No, and Step 431 is carried out then. In this case, when a seeking distance from the focus jump position to the target position is so short that only a shift of the objective lens by the tracking actuator may achieve the distance as mentioned above, fine seeking is carried out. On the other hand, when a seek distance is so long that only a shift of the objective lens by the tracking actuator may not achieve the distance, coarse seeking is carried out first and after that, fine seeking is carried out.

Figure 12A:
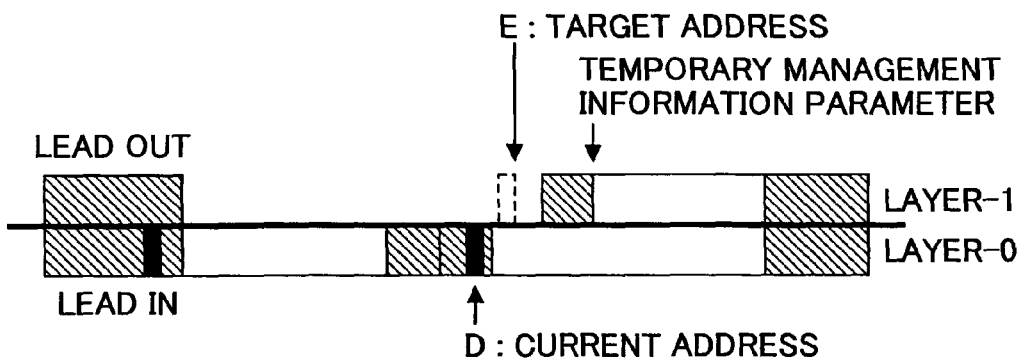
FIGS. 12A through 12C illustrate a scanning path in the boundary position obtaining processing.
Figure 12B:
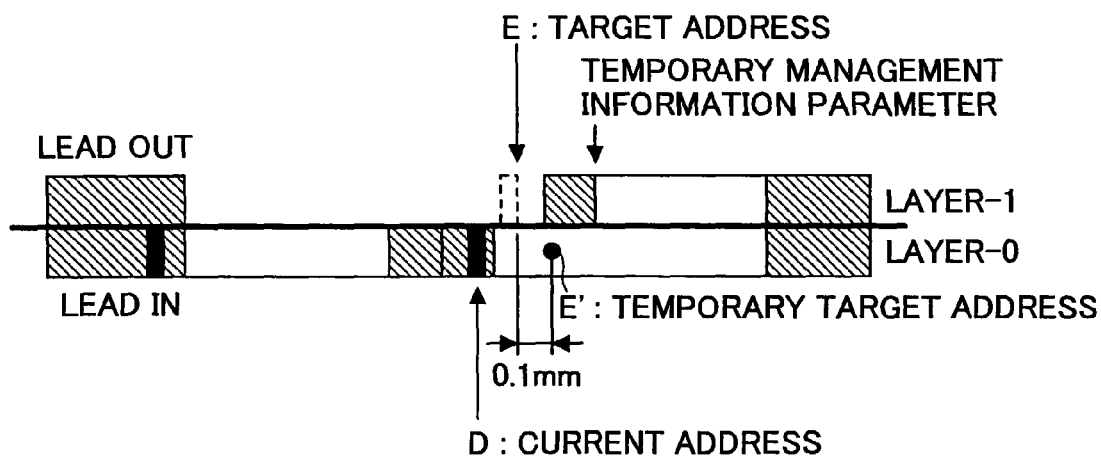
Figure 12C:
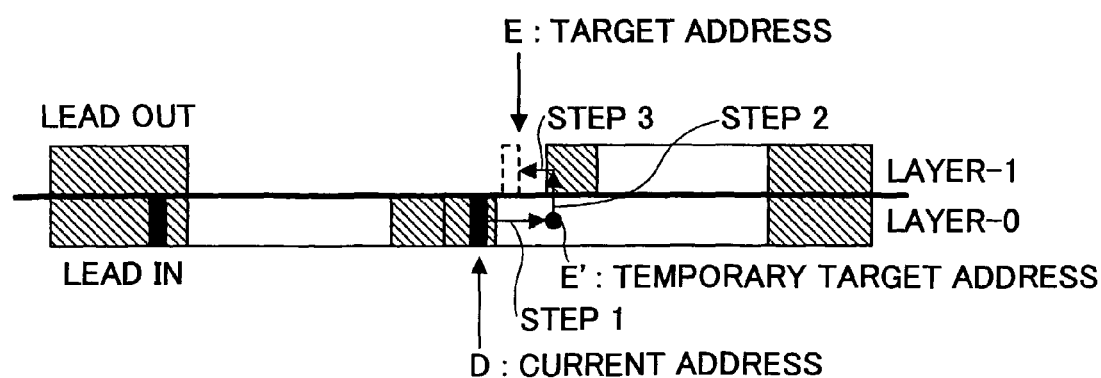

In the above-mentioned boundary position obtaining processing, as shown in FIG. 12A for example, the same processing as the above-mentioned reproduction processing may be carried out, for reproducing the management information zone in intro of the third session in the management information parameter obtaining processing before the information concerning the boundary position between the not-yet-recorded zone and the already-recorded zone is obtained. In this case, an end address of the user data in the second session can be regarded as a temporary management information parameter, and the management information zone in intro of the second session is regarded as a current address (address D) and the management information zone in intro of the third session is regarded as a target address (address E). Then, as shown in FIG. 12B, a temporary target address (address E') is set, and, as shown in FIG. 12C, the target address is reached in the second scanning path (through Step 1 through Step 3s, shown).

Figure 13A:
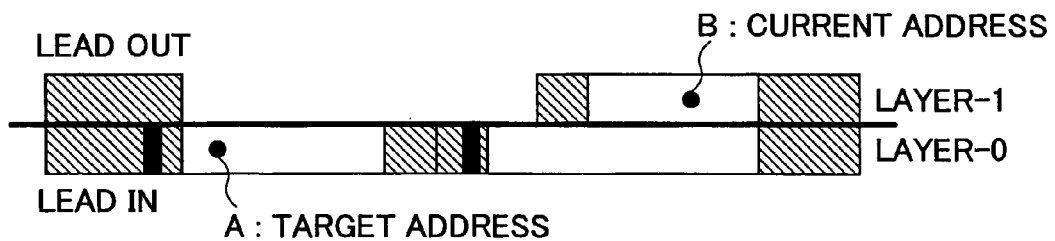
FIGS. 13A through 13C illustrate reproducing processing for a case in which a current address and a target address are replaced from one another, from the case of FIGS. 10A through 10D.
Figure 13B:
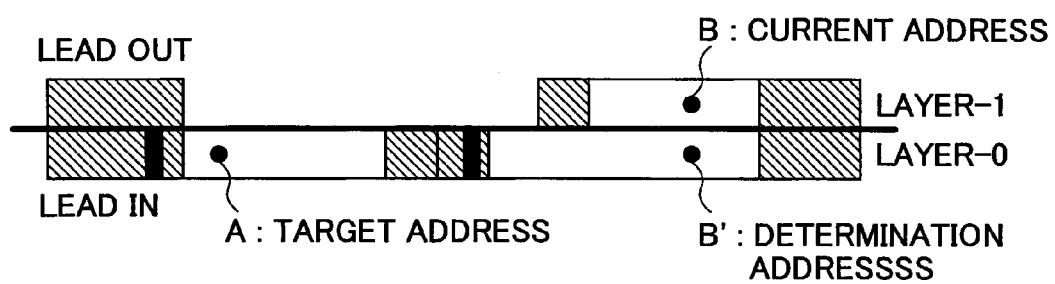
Figure 13C:
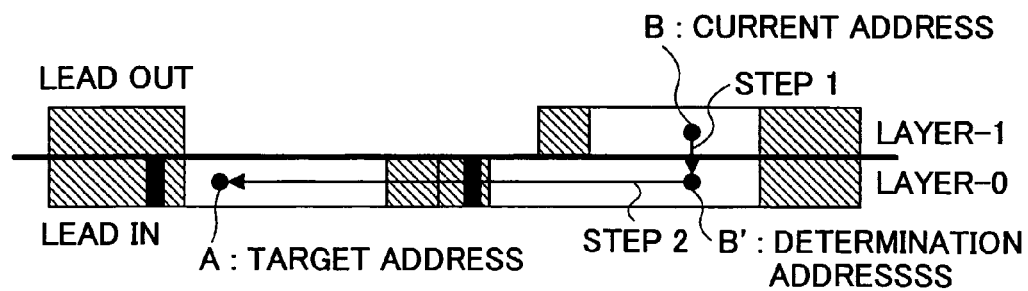

Further, for a case where, contrary to the case of FIG. 10A, the above-mentioned address A is a target address and the above-mentioned address B is a current address as shown in FIG. 13A, the determination address is an address included in the already-recorded zone as shown in FIG. 13B, and the target address is reached in the first scanning path as shown in FIG. 13C (through Step 1 and Step 2 shown).

Figure 14A:
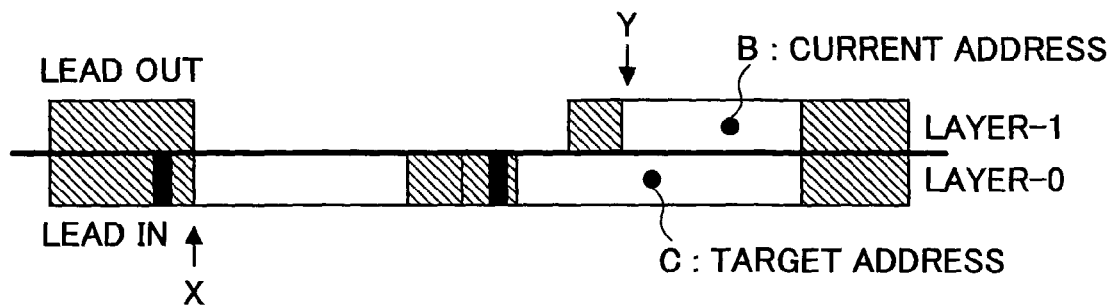
FIGS. 14A through 14C illustrate reproducing processing for a case in which a current address and a target address are replaced from one another, from the case of FIGS. 11A through 11C.
Figure 14B:
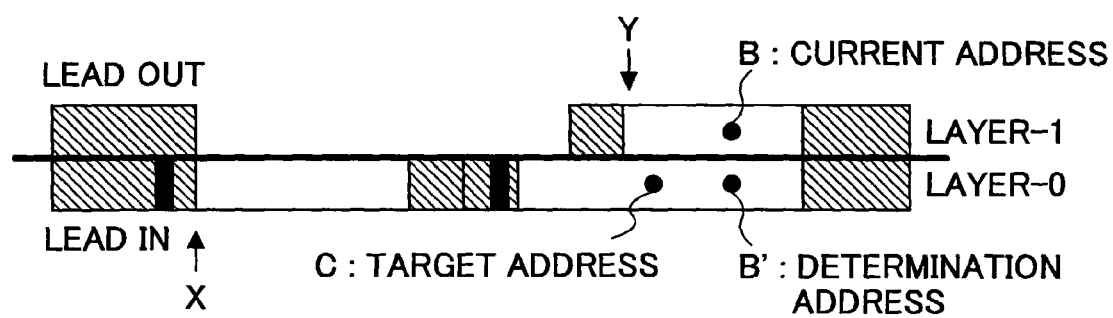
Figure 14C:
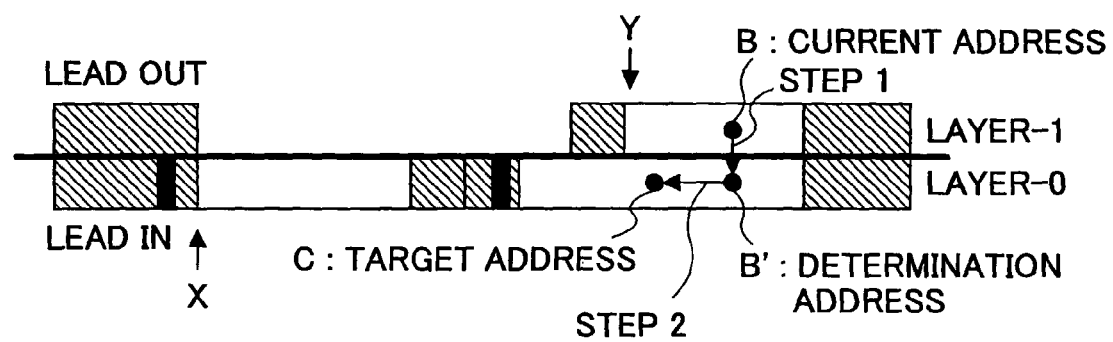

Furthermore, also for a case where, contrary to the case of FIG. 11A, the above-mentioned address C is a target address and the above-mentioned address B is a current address as shown in FIG. 14A, the determination address is an address included in the already-recorded zone as shown in FIG. 14B, and the target address is reached in the first scanning path as shown in FIG. 14C (through Step 1 and Step 2 shown).

As can be seen from the above description, a control unit is realized from the CPU 40 and the program executed by the CPU 40 in the optical disk apparatus 20 in the present embodiment. That is, the control unit is realized by Steps 403 through 431 of FIG. 9. It is noted that, at least a part of the control unit thus realized by processing carried out by the CPU 40 according to the program may be configured by hardware. Or, all thereof may be configured by hardware. Further, a processing unit is configured by the reproduced signal processing circuit 28.

Further, in the present embodiment, a program according to the present invention is configured by the above-mentioned reproduction processing program of the programs stored by the flash memory 39 as a computer readable information recording medium. That is, a selecting step is configured by a program corresponding to Steps 403 though 419 of FIG. 9.

Furthermore, by the above-mentioned reproduction processing, a reproducing method according to the present invention is executed. That is, a selecting step is executed by processing of Steps 403 through 419 of FIG. 9.

As described above, according to the optical disk apparatus according to the present embodiment, when the optical disk 15 having the two recording layers and having, in its information area, the not-yet-recorded zone and the already-recorded zone mixed therein is set, the management information parameter indicating the boundary position between the not-yet-recorded zone and the already-recorded zone is obtained. Then, when receiving a reproduction request command from the host apparatus 90, the reproduction request command is responded to, and an optical spot is applied to scan from a current address (first address) as a start point on a current recording layer Ln (first recording layer) for a reproduction target address (second address) on a target recording layer Lt (second recording layer). At this time, a determination address obtained from the current address and a management information parameter are referred to, and the second scanning path is selected when the determination address is included in the not-yet-recorded zone, while, the first scanning path is selected when the determination address is included in the already-recorded zone. Thereby, the optical spot is applied to scan for the target address along the already-recorded zone of the layer-0 and the layer-1, and thus, address information required for the scanning can be appropriately and properly obtained during the scanning. As a result, the optical spot can be precisely produced at the target address finally. Accordingly, information recorded in the optical disk having the plurality of recording layers and having the not-yet-recorded zone and the already-recorded zone mixed therein can be properly and stably reproduced.

Further, according to the present embodiment, when the second scanning path is selected, an address on the layer-0 at a position shifted from a radial position of a target address by approximately 0.1 mm to the outer circumferential side is set as a temporary target address. Thereby, even when the target address is close to a not-yet-recorded zone, access to the not-yet-recorded zone otherwise occurring at a time of focus jump can be avoided. As a result, information recorded in the optical disk 15 can be properly and stably reproduced. The shifting amount is not limited to the above-mentioned 0.1 mm. For example, any other value may be applied as long as it is within a range achievable by fine seeking.

For the above-mentioned embodiment, description has been made for a case where, management information recorded in a management information zone in lead in (or intro) is obtained from a first session in sequence, for searching for a last session. However, a way of searching for a last session is not limited thereto. For example, if information concerning a last session can be immediately obtained from other management information recorded in the optical disk, the management information parameter may be obtained based on that information. Alternatively, if information concerning the already-recorded zone can be immediately obtained from other management information recorded in the optical disk, the management information parameter may be obtained based on that information.

Figure 15A:
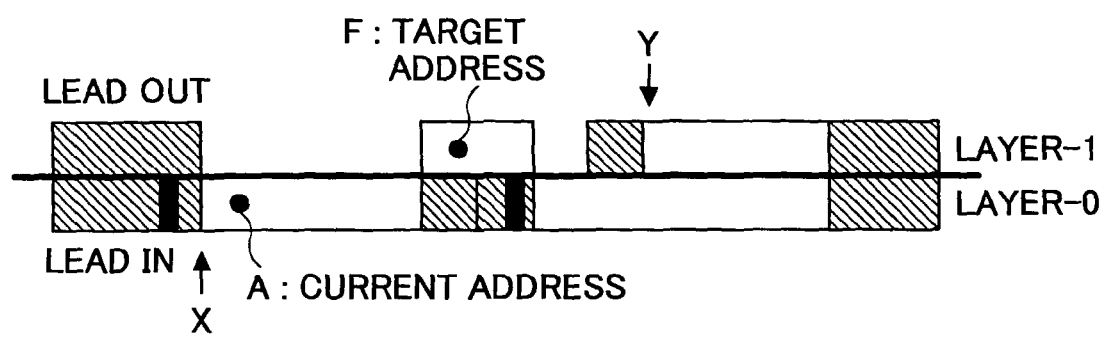
FIGS. 15A through 15D illustrate reproducing processing for a case where a third session is an open session.
Figure 15B:
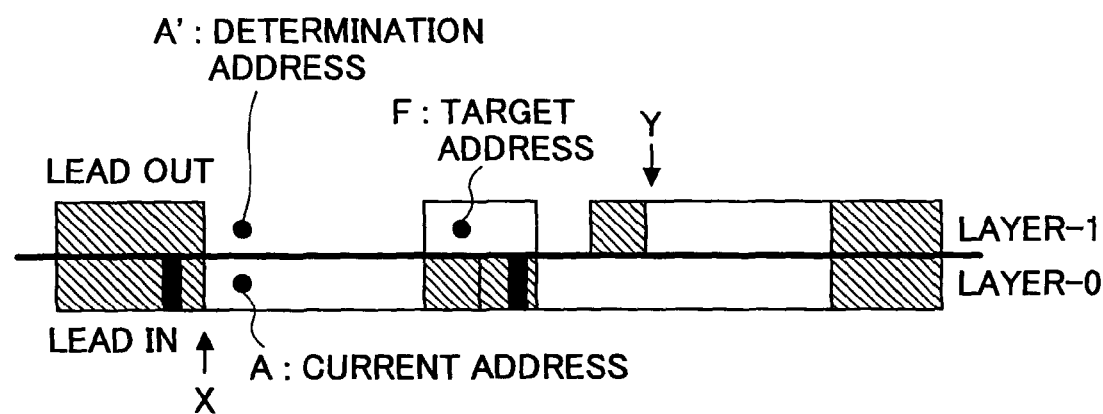
Figure 15C:
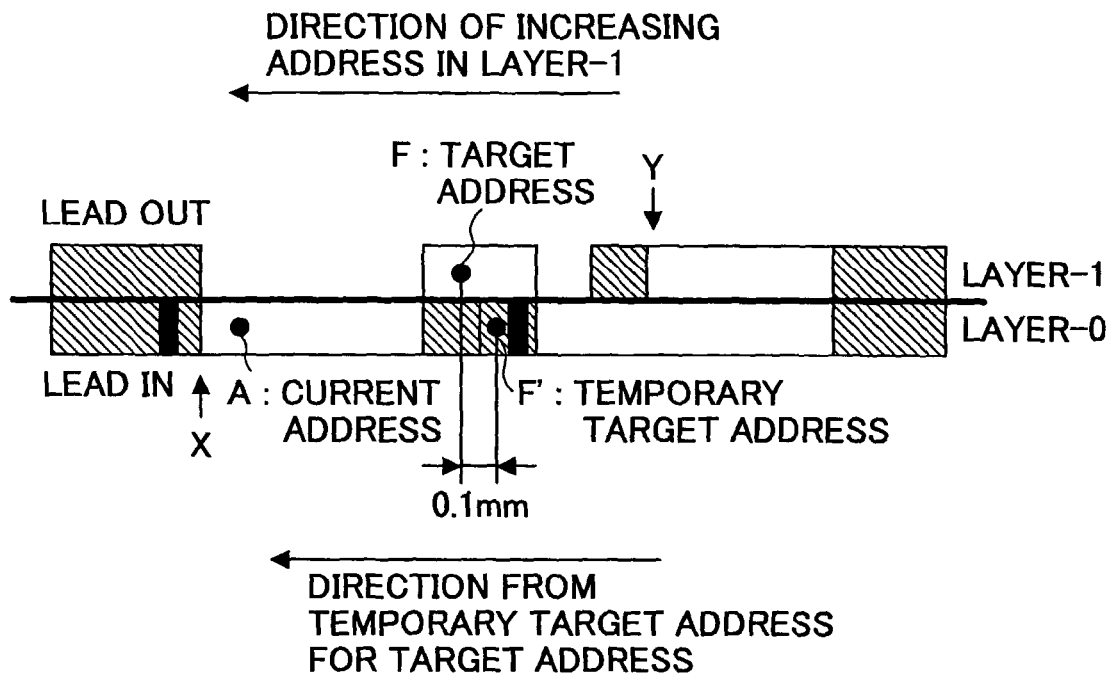
Figure 15D:
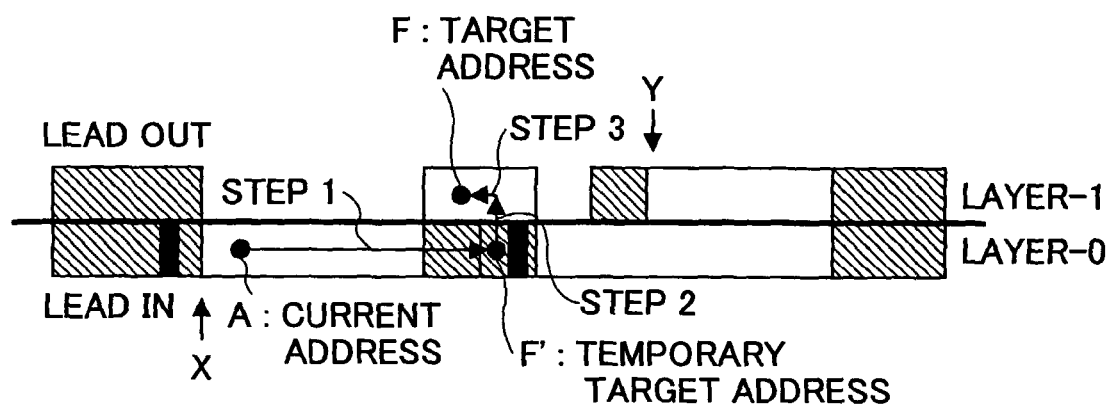
Figure 16A:
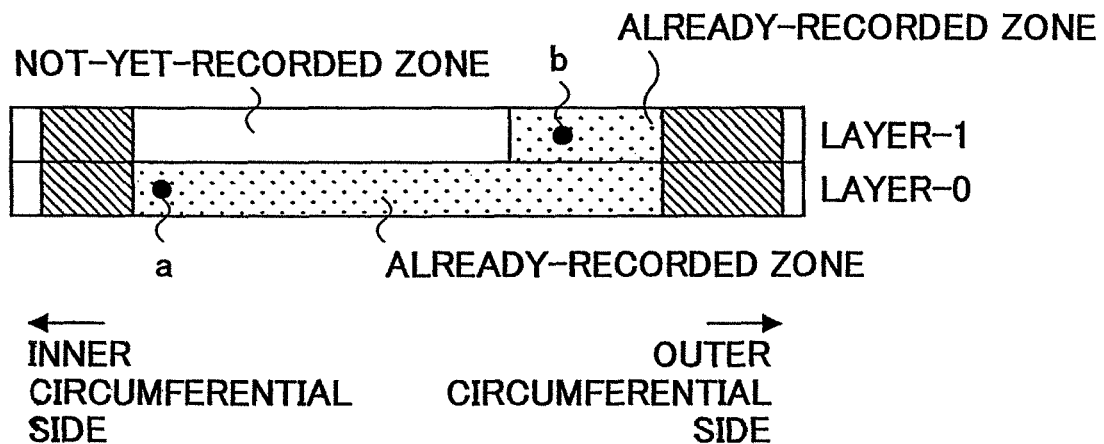
FIGS. 16A through 16C illustrate an access error in a drive apparatus in the related art, respectively.
Figure 16B:
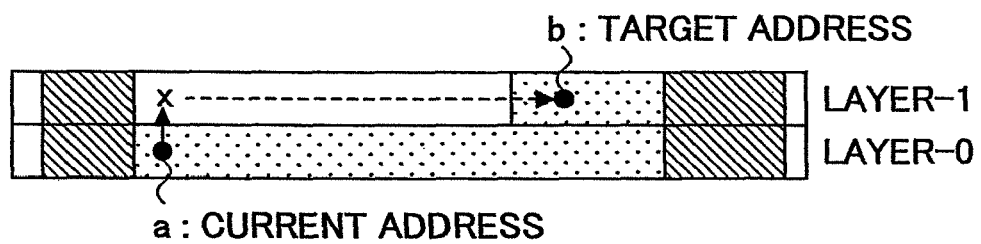
Figure 16C:
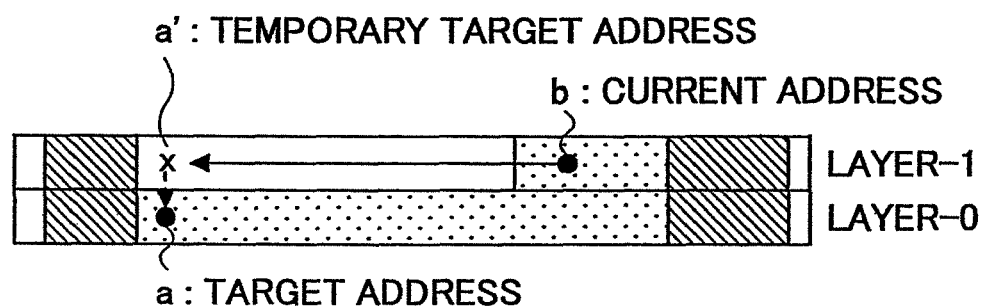

Further, when the optical disk 15 having a state in which the third session is an open session is set in the optical disk apparatus 20 as shown in FIG. 15A for example, the management information parameter is obtained by the above-mentioned boundary position obtaining processing. The management information parameter thus obtained as the same as the management information parameter obtained in the above-mentioned embodiment. Then, when a current address (in this case, an address A) is in the vicinity of the above-mentioned address X on the layer-0 and a target address (in this case, an address F) is included in the third session, the determination address (in this case, an address A') is included in a not-yet-recorded zones as shown in FIG. 15B. As a result, as shown FIGS. 15C and 15D, the second scanning path is selected.

For the above-mentioned embodiment, the case has been described where the address on the layer-0 shifted from the radial position of the target address to the outer circumferential side is set as the temporary target address. However, the temporary address should not be positively shifted when a possibility that focus jump results in access to the not-yet-recorded zone is almost zero.

Further, for the above-mentioned embodiment, a case has been described where, when the second scanning path is selected, coarse seeking is carried out first from the start point for the temporary target address. However, coarse seeking may be omitted when a seeking distance required for the temporary target address from the current address is so short that the distance can be achieved merely by a shift of the objective lens by the tracking actuator as mentioned above.

Further, for the above-mentioned embodiment, a case has been described where, when the second scanning path is selected, fine seeking is carried out for the target address after focus jump. However, coarse seeking may be carried out in prior to the fine seeking when a seeking distance required for the target address from the focus jump position is so long that the distance cannot be achieved merely by a shift of the objective lens by the tracking actuator as mentioned above.

Further, for the above-mentioned embodiment, a case has been described where, the optical disk confirms to the single-side double-layer DVD+R standard. However, the present invention is not limited thereto. For example, a single-side double-layer optical disk in a next generation prepared for light of approximately 405 nm may also be applied instead.

Further, for the above-mentioned embodiment, a case has been described where recording to the optical disk is carried out in the OTP type. However, the present invention is not limited thereto. For example, the PTO type may be applied instead.

Further, for the above-mentioned embodiment, a case has been described where the optical disk has the two recording layers. However, the present invention is not limited thereto. For example, an optical disk having more than two recording layers may also be applied instead.

Further, in the above-mentioned embodiment, the programs according to the present invention are stored in the flash memory 39. However, instead, the same may be stored in another type of a computer readable information recording medium (a CD, a magneto-optical disk, a DVD, a memory card, a flexible disk, or such). In this case, the programs according to the present invention are loaded in the flash memory 39 with the use of a reproducing device (or a special interface) prepared for handling each of these information recording media. Alternatively, the programs according to the present invention may be transferred to the flash memory 39 via a communication network (a LAN, an intranet, the Internet. or such). In any way, the programs according to the present invention should be loaded in the flash memory 39.

Further, for the above-mentioned embodiment, a case has been described where a single semiconductor laser is provided in the optical disk apparatus. However, the present invention is not limited thereto. For example, instead, the optical disk apparatus may be provided with a plurality of semiconductor lasers emitting light fluxes (or laser beams) having different wavelengths, respectively. In this case, at least one of a semiconductor laser emitting a light flux of approximately 405 nm, a semiconductor laser emitting a light flux of approximately 660 nm and a semiconductor laser emitting a light flux of approximately 780 nm may be provided, for example. That is, the optical disk apparatus may be one which can handle, by itself alone, a plurality of types of optical disks conforming to a plurality of different standards, respectively. In this case, at least one of the plurality of optical disks should have a plurality of recording layers.

As described above, a reproducing method according to the present invention is advantageous for properly and stably reproducing information recorded in an optical disk having a plurality of recording layers and having a not-yet-recorded zone and an already-recorded zone mixed therein. Further, an optical disk apparatus according to the present invention is advantageous for properly and stably reproducing information recorded in an optical disk having a plurality of recording layers and having a not-yet-recorded zone and an already-recorded zone mixed therein. Further, a program and a computer readable information recording medium storing the program according to the present invention is advantageous for causing an optical disk apparatus to properly and stably reproducing information recorded in an optical disk having a plurality of recording layers and having a not-yet-recorded zone and an already-recorded zone mixed therein.

Further, the present invention is not limited to the above-described embodiment, and variations and modifications may be made without departing from the basic concept of the present invention claimed below.

The present application is based on Japanese Priority Application No. 2004-302562, filed on Oct. 18, 2004, the entire contents of which are hereby incorporated herein by reference.

The invention claimed is:

1. A reproducing method for reproducing information from an optical disk having a plurality of recording layers including a first recording layer and a second recording layer, comprising the step of:
upon scanning with an optical spot from a first address on the first recording layer as a start point for a second address on the second recording layer which is a target address for reproducing in order to detect a reproduction position, selecting a scanning path for reaching the second address by scanning an already-recorded zone of at least one of the first recording layer and the second recording layer, from a first scanning path to carry out seeking after focus jump and a second scanning path to carry out coarse seeking before focus jump and only fine seeking after the focus jump, based on a positional relationship between a known boundary position between a not-yet-recorded zone and an already-recorded zone of the first recording layer or the second recording layer and the first address,
wherein, the first scanning path is selected when a determination address belonging to the second recording layer in the vicinity of the first address is included in said already-recorded zone with respect to the radial direction of the optical disk, and the second scanning path is selected when a determination address belonging to the second recording layer in the vicinity of the first address is included in said not-yet-recorded zone with respect to the radial direction of the optical disk.

2. The reproducing method as claimed in claim 1, wherein:
said already-recorded zone includes a plurality of partial zones recording user data separately; and
said boundary position comprises an end address of the user data of the partial zone recording the user data at the last from among the plurality of partial zones.

3. The reproducing method as claimed in claim 1, wherein:
the first scanning path comprises a scanning path to carry out seeking for the second address in the second recording layer after focus jump from the first recording layer to the second recording layer at said start point; and
said second scanning path comprises a scanning path to carry out fine seeking for the second address in the second recording layer after focus jump from the first recording layer to the second recording layer at a third address after coarse seeking is made from said start point in the first recording layer for the third address belonging to the first recording layer in the vicinity of the second address with respect to a radial direction of the optical disk.

4. The reproducing method as claimed in claim 3, wherein:
in said second scanning path, a direction from the third address for the second address is the same as a direction in which an address increases in the second recording layer, with respect to the radial direction of the optical disk.

5. An optical disk apparatus for reproducing information from an optical disk having a plurality of recording layers including a first recording layer and a second recording layer, comprising:
an optical pickup unit producing an optical spot on any one of the plurality of recording layers of the optical disk with the use of an objective lens, and receiving reflected light from said recording layer;
a control unit configured to, upon scanning with an optical spot from a first address on the first recording layer as a start point for a second address on the second recording layer which is a target address for reproducing in order to detect a reproduction position, select a scanning path for reaching the second address by scanning an already-recorded zone of at least one of the first recording layer and the second recording layer, from a first scanning path to carry out seeking after focus jump and a second scanning path to carry out coarse seeking before focus jump and only fine seeking after the focus jump, based on a positional relationship between a known boundary position between a not-yet-recorded zone and an already-recorded zone of the first recording layer or the second recording layer and the first address; and controlling the optical pickup unit to scan with the optical spot along said scanning path; and
a processing unit configured to reproduce information with the use of an output signal of said optical pickup unit,
wherein said control unit selects the first scanning path when a determination address belonging to the second recording layer in the vicinity of the first address is included in said already-recorded zone with respect to the radial direction of the optical disk, and said control unit selects the second scanning path when a determination address belonging to the second recording layer in the vicinity of the first address is included in said not-yet-recorded zone with respect to the radial direction of the optical disk.

6. The optical disk apparatus as claimed in claim 5, wherein:
said already-recorded zone includes a plurality of partial zones recording user data separately; and said boundary position comprises an end address of the user data of the partial zone recording the user data at the last from among the plurality of partial zones.

7. The optical disk apparatus as claimed in claim 5, wherein:
the first scanning path comprises a scanning path to carry out seeking for the second address in the second recording layer after focus jump from the first recording layer to the second recording layer at said start point; and
said second scanning path comprises a scanning path to carry out fine seeking for the second address in the second recording layer after focus jump from the first recording layer to the second recording layer at a third address after coarse seeking is made from said start point in the first recording layer for the third address belonging to the first recording layer in the vicinity of the second address with respect to a radial direction of the optical disk.

8. The optical disk apparatus as claimed in claim 7, wherein:
in said second scanning path, a direction from the third address for the second address is the same as a direction in which an address increases in the second recording layer, with respect to the radial direction of the optical disk.

9. A non-transitory computer-readable medium encoded with a computer program to control an optical disk apparatus for reproducing information from an optical disk having a plurality of recording layers including a first recording layer and a second recording layer, the computer program comprising instructions to cause a computer to carry out the step of:
upon scanning with an optical spot from a first address on the first recording layer as a start point for a second address on the second recording layer which is a target address for reproducing in order to detect a reproduction position, selecting a scanning path for reaching the second address by scanning an already recorded zone of at least one of the first recording layer and the second recording layer, from a first scanning path to carry out seeking after focus jump and a second scanning path to carry out coarse seeking before focus jump and only fine seeking after the focus jump, based on a positional relationship between a known boundary position between a not-yet-recorded zone and an already-recorded zone of the first recording layer or the second recording layer and the first address,
wherein, the first scanning path is selected when a determination address belonging to the second recording layer in the vicinity of the first address is included in said already-recorded zone with respect to the radial direction of the optical disk, and the second scanning path is selected when a determination address belonging to the second recording layer in the vicinity of the first address is included in said not-yet-recorded zone with respect to the radial direction of the optical disk.

10. The non-transitory computer-readable medium as claimed in claim 9, wherein:
said already-recorded zone includes a plurality of partial zones recording user data separately; and
said boundary position comprises an end address of the user data of the partial zone recording the user data at the last from among the plurality of partial zones.

11. The non-transitory computer-readable medium as claimed in claim 9, wherein:
the first scanning path comprises a scanning path to carry out seeking for the second address in the second recording layer after focus jump from the first recording layer to the second recording layer at said start point; and
said second scanning path comprises a scanning path to carry out fine seeking for the second address in the second recording layer after focus jump from the first recording layer to the second recording layer at a third address after coarse seeking is made from said start point in the first recording layer for the third address belonging to the first recording layer in the vicinity of the second address with respect to a radial direction of the optical disk.

12. The non-transitory computer-readable medium as claimed in claim 11, wherein:
in said second scanning path, a direction from the third address for the second address is the same as a direction in which an address increases in the second recording layer, with respect to the radial direction of the optical disk.

* * * * *